US010769749B2

(12) United States Patent
Yoda et al.

(10) Patent No.: US 10,769,749 B2
(45) Date of Patent: Sep. 8, 2020

(54) PROCESSOR, INFORMATION PROCESSING APPARATUS, AND OPERATION METHOD OF PROCESSOR

(71) Applicant: FUJITSU LIMITED, Kawasaki-shi, Kanagawa (JP)

(72) Inventors: Katsuhiro Yoda, Kodaira (JP); Mitsuru Tomono, Higashimurayama (JP); Takahiro Notsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 48 days.

(21) Appl. No.: 16/288,185

(22) Filed: Feb. 28, 2019

(65) Prior Publication Data

US 2019/0197656 A1    Jun. 27, 2019

Related U.S. Application Data

(63) Continuation of application No. PCT/JP2018/000124, filed on Jan. 5, 2018.

(30) Foreign Application Priority Data

Jan. 27, 2017    (JP) .................................. 2017-013398

(51) Int. Cl.
*G06T 1/20* (2006.01)
*G06T 1/60* (2006.01)
(Continued)

(52) U.S. Cl.
CPC .............. *G06T 1/20* (2013.01); *G06F 9/3001* (2013.01); *G06F 9/30018* (2013.01);
(Continued)

(58) Field of Classification Search
CPC ........... G06T 1/20; G06T 1/60; G06T 3/4023; G06T 5/20; G06T 2207/20024;
(Continued)

(56) References Cited

U.S. PATENT DOCUMENTS

2005/0179784 A1    8/2005  Qi
2010/0332794 A1   12/2010  Hargil et al.
(Continued)

FOREIGN PATENT DOCUMENTS

JP    H03-196257 A    8/1991
JP    2000-020705 A   1/2000
(Continued)

OTHER PUBLICATIONS

International Search Report and Written Opinion of the International Searching Authority with partial translation(Form PCT/ISA/210, 220, and 237), dated connection with PCT/JP2018/000124 and dated Mar. 13, 2018 (10 pages).

*Primary Examiner* — Daniel G Mariam
(74) *Attorney, Agent, or Firm* — Fujitsu Patent Center

(57) ABSTRACT

A processor includes: a first memory configured to store image data including pixel data of a plurality of pixels that are two-dimensionally arranged; a second memory configured to store neighborhood matrix image data including pixel data of a neighborhood matrix; and a format converter that includes (a) a readout circuit configured to read out the image data from the first memory, (b) a padding arithmetic unit configured to receive the read-out image data, select pixel data of the received read-out image data and padding data inserted at periphery of the plurality of pixels in accordance with mask values of a padding mask, and generate the neighborhood matrix image data including the pixel data and the padding data, and (c) a writing circuit configured to write the neighborhood matrix image data to the second memory.

11 Claims, 22 Drawing Sheets

(51) Int. Cl.
    *G06T 5/20*        (2006.01)
    *G06T 3/40*        (2006.01)
    *G06F 17/16*       (2006.01)
    *G06F 9/30*        (2018.01)
    *G06F 15/80*       (2006.01)
    *G06F 17/15*       (2006.01)
    *G06N 3/08*        (2006.01)

(52) U.S. Cl.
    CPC ............ *G06F 15/80* (2013.01); *G06F 17/153* (2013.01); *G06F 17/16* (2013.01); *G06T 1/60* (2013.01); *G06T 3/4023* (2013.01); *G06T 5/20* (2013.01); *G06N 3/08* (2013.01); *G06T 2207/20024* (2013.01); *G06T 2207/20081* (2013.01); *G06T 2207/20084* (2013.01)

(58) Field of Classification Search
    CPC . G06T 2207/20081; G06T 2207/20084; G06F 15/80; G06F 17/16; G06F 17/153; G06F 9/3001; G06F 9/30018; G06N 3/08

USPC ........................................................ 382/235
See application file for complete search history.

(56) References Cited

U.S. PATENT DOCUMENTS

2011/0228296 A1*   9/2011   Ikuno ..................... H04N 1/64
                                                             358/1.9
2012/0133805 A1   5/2012   Ohwa
2012/0254592 A1   10/2012  San Adrian et al.

FOREIGN PATENT DOCUMENTS

| JP | 2006-094160 A | 4/2006 |
| --- | --- | --- |
| JP | 2009-199491 A | 9/2009 |
| JP | 2009-303236 A | 12/2009 |
| JP | 2012-118699 A | 6/2012 |
| JP | 2014-063522 A | 4/2014 |
| JP | 2016-029598 A | 3/2016 |

* cited by examiner

FIG. 5
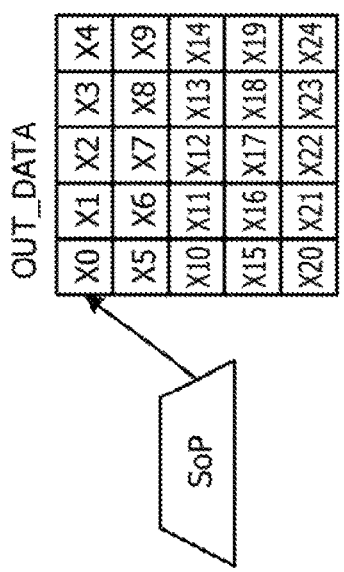
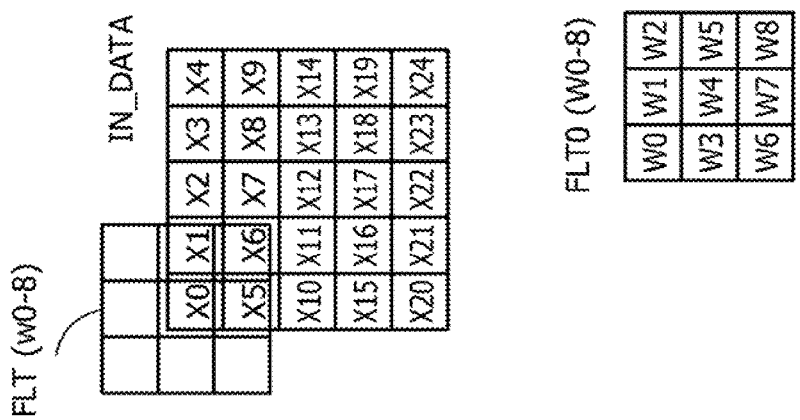

IMAGE DATA

| data0 | X0 | X1 | X2 | X3 | X4 | X5 | X6 | X7 | X8 | X9 | X10 | X11 | X12 | X13 | X14 | X15 | X16 | X17 | X18 | X19 | X20 | X21 | X22 | X23 | X24 | X25 | X26 | X27 | X28 | X29 | X30 | X31 |

(12) X12

| Cmask | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| Pmask | 3 | 3 | 1 | 1 | 1 | 1 | 1 | 1 | 1 | 1 | 1 | 1 | 3 | 0 | 0 | 0 | 0 | 0 | 0 | 0 | 0 | 0 | 0 | 0 | 0 | 0 | 0 | 0 | 0 | 0 | 0 | 0 |
| data2 | P | P | P | P | P | P | P | P | P | P | P | X11 | X12 | P | X24 | X25 | 0 | 0 | 0 | 0 | 0 | 0 | 0 | 0 | 0 | 0 | 0 | 0 | 0 | 0 | 0 | 0 |

(13) X13

| Cmask | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| Pmask | 3 | 1 | 1 | 1 | 1 | 1 | 1 | 1 | 1 | 1 | 1 | 1 | 1 | 3 | 0 | 0 | 0 | 0 | 0 | 0 | 0 | 0 | 0 | 0 | 0 | 0 | 0 | 0 | 0 | 0 | 0 | 0 |
| data2 | P | X0 | X1 | P | X13 | X14 | P | X26 | X27 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

(14) X14

| Cmask | 1 | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| Pmask | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |
| data2 | X0 | X1 | X2 | X13 | X14 | X15 | X26 | X27 | X28 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

(3) X3-

| Cmask | 0 | 1 | 1 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 |
| Pmask | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 |
| data2 | X1 | X2 | X3 | X14 | X15 | X16 | X27 | X28 | X29 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Cmask: SHIFTED RIGHT BY ONE ADDRESS, Pmask: FIXED

Pmask: MASK VALUES CHANGE IN UNITS OF ROW OF INPUT DATA. BASICALLY NINE MASK VALUES "1" CORRESPONDING TO FILTER SIZE ARE SET. THREE MASK VALUES "3" ARE SET ON FRONT OR BACK SIDE ONLY FOR UPPERMOST ROW AND LOWERMOST ROW.

NEIGHBORHOOD MATRIX IMAGE DATA AFTER FORMAT CONVERSION

|     | 0 | 1 | 2 | 3 | 4 | 5 | 6 | 7 | 8 |
| --- | --- | --- | --- | --- | --- | --- | --- | --- | --- |
| X12 | P | P | P | X11 | X12 | P | X24 | X25 | P |
| X13 | P | X0 | X1 | P | X13 | X14 | P | X26 | X27 |
| X14 | X0 | X1 | X2 | X13 | X14 | X15 | X26 | X27 | X28 |
| X15 | X1 | X2 | X3 | X14 | X15 | X16 | X27 | X28 | X29 |

PROCESSOR, INFORMATION PROCESSING APPARATUS, AND OPERATION METHOD OF PROCESSOR

CROSS-REFERENCE TO RELATED APPLICATION

This application is a continuation application of International Application PCT/JP2018/000124 filed on Jan. 5, 2018 and designated the U.S., the entire contents of which are incorporated herein by reference. The International Application PCT/JP2018/000124 is based upon and claims the benefit of priority of the prior Japanese Patent Application No. 2017-013398, filed on Jan. 27, 2017, the entire contents of which are incorporated herein by reference.

FIELD

The embodiments discussed herein are related to a processor, an information processing apparatus, and an operation method of a processor.

BACKGROUND

Deep learning (hereinafter, DL) is executed by arithmetic processing by a processor in an information processing apparatus. The DL is a generic term of algorithms using a neural network with a deep hierarchy (hereinafter, DNN: deep neural network). Furthermore, a neural network frequently used in the DNN is the convolution neural network (CNN). The CNN is widely used as a DNN to determine features of image data, for example.

With the CNN to determine features of image data, the image data is input and a convolution operation using a filter is carried out to detect the features of the image data (for example, features of the edge and so forth).

Examples of the related art include Japanese Laid-open Patent Publication No. 2014-063522, Japanese Laid-open Patent Publication No. 2016-029598, Japanese Laid-open Patent Publication No. 2009-303236, and Japanese Laid-open Patent Publication No. 03-196257.

SUMMARY

According to an aspect of the embodiments, a processor includes: a first memory configured to store image data including pixel data of a plurality of pixels that are two-dimensionally arranged; a second memory configured to store neighborhood matrix image data including pixel data of a neighborhood matrix; and a format converter that includes (a) a readout circuit configured to read out the image data from the first memory, (b) a padding arithmetic unit configured to receive the read-out image data, select pixel data of the received read-out image data and padding data inserted at periphery of the plurality of pixels in accordance with mask values of a padding mask, and generate the neighborhood matrix image data including the pixel data and the padding data, and (c) a writing circuit configured to write the neighborhood matrix image data to the second memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates a first example of a sum-of-product operation between image data and a coefficient filter;

FIG. 11 illustrates image data;

FIG. 12 illustrates one example of neighborhood matrix image data and coefficients (weights W) of a filter in the case of the image data of 13 rows and 13 columns in FIG. 11;

FIG. 17 is a diagram illustrating a compression mask and a padding mask corresponding to an attention-paid pixel;

FIG. 18 is another diagram illustrating the compression mask and the padding mask corresponding to the attention-paid pixel;

DESCRIPTION OF EMBODIMENTS

The image data is color data of two-dimensional pixels (hereinafter, pixel data). Meanwhile, the convolution operation by a coefficient filter that is a coefficient matrix includes processing of extracting the pixel data of a neighborhood matrix centered at an attention-paid pixel from padding-extended image data obtained by inserting padding (margin) at the periphery of the image data and generating neighborhood matrix image data and sum-of-product operation processing of multiplying the extracted neighborhood matrix image data with each of weights of the coefficient filter and adding the multiplication results. The sum-of-product operation generates the filtering result of the attention-paid pixel, which is the central pixel of the neighborhood matrix. In the convolution operation, the generation of the above-described neighborhood matrix image data and the sum-of-product operation are repeated while the position of the coefficient filter is moved in the raster-scan direction.

In the generation processing of the above-described neighborhood matrix image data, random reading-out from a first memory that stores the image data and processing of writing to a second memory that stores the neighborhood matrix image data are desired. This generation processing of the neighborhood matrix image data takes a great deal of man-hours as pre-processing of the convolution operation. In addition, a very large number of convolution operations are included in the operation of the DNN, and therefore saving the generation processing of the neighborhood matrix image data greatly contributes to reduction in the man-hours of the operation of the DNN.

Thus, one of objects of the embodiments is to provide a processor, an information processing apparatus, and an operation method of a processor with which the generation processing of the neighborhood matrix image data of the convolution operation is efficiently executed. According to one aspect, it is expected that the generation processing of the neighborhood matrix image data of the convolution operation can be efficiently executed.

Figure 1:
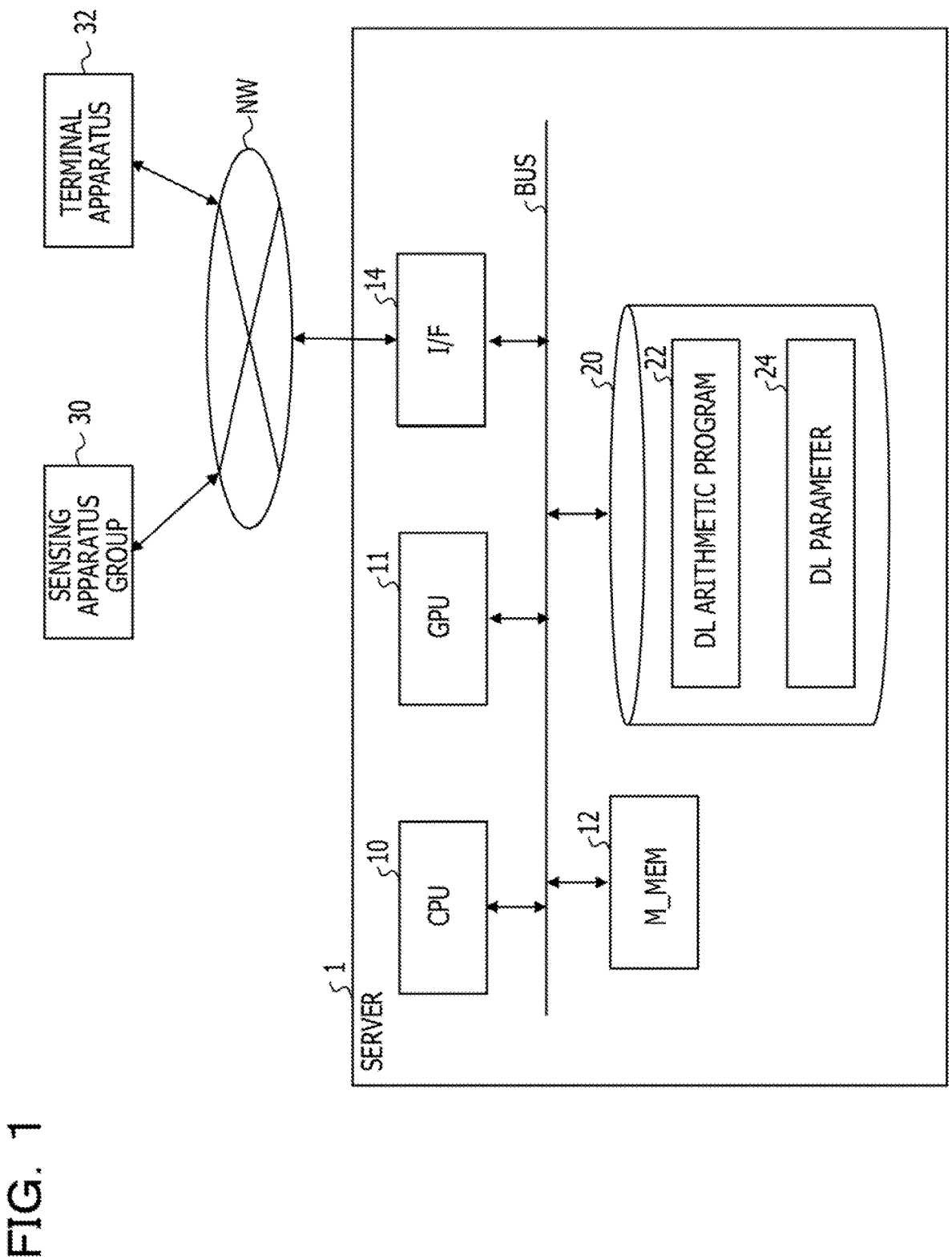
FIG. 1 illustrates a configuration of an information processing apparatus (deep learning server) in the present embodiment.

FIG. 1 is a diagram illustrating a configuration of an information processing apparatus (deep learning server) in the present embodiment. A server 1 may communicate with a sensing apparatus group 30 and a terminal apparatus 32 through a network. The sensing apparatus group 30 captures an image by an imaging element, for example, and generates image data to transmit the image data to the server 1. The terminal apparatus 32 receives a determination result of features of the image data from the server 1 and outputs the determination result.

The server 1 includes a central processing unit (CPU) 10 that is a general-purpose processor and a graphic processing unit (GPU) 11 that is a graphic processor. Moreover, the server 1 includes a main memory 12 such as a dynamic random access memory (DRAM), a network interface 14 such as a network interface card (NIC), a high-capacity auxiliary memory 20 such as a hard disk or solid storage device (SSD), and a bus BUS that couples them.

The auxiliary memory 20 stores a deep learning arithmetic program 22, deep learning parameters 24, and so forth. The auxiliary memory 20 also stores an operating system (OS), various kinds of middleware programs, and so forth that are not illustrated in addition to the above-described program and parameters. The processor 10 and the graphic processor 11 load the above-described program and parameters into the main memory 12 and execute the program based on the parameters.

Figure 2:
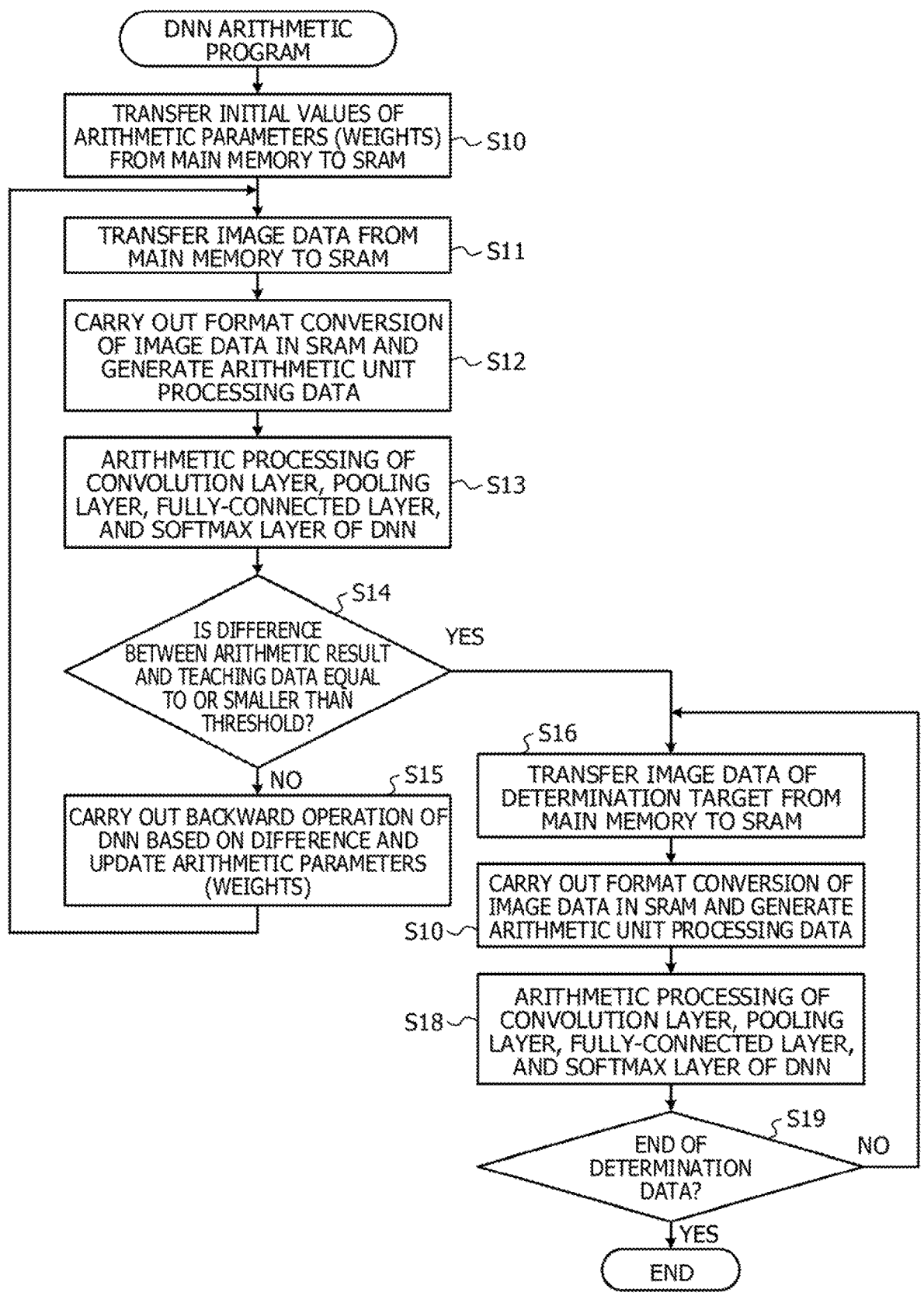
FIG. 2 is a flowchart diagram illustrating schematic processing of a deep learning arithmetic program.

FIG. 2 is a flowchart diagram illustrating schematic processing of a deep learning arithmetic program. The DL arithmetic program is a program to carry out the operation of a DNN, for example. The processor 10 and the graphic processor 11 execute the DL arithmetic program and execute processing of a learning mode and a determination mode. A description will be made by taking the DNN to determine features of image data as an example as the DL.

In the learning mode, the processor 10 and the graphic processor 11 read out the initial values of arithmetic parameters (weights of a filter) from the main memory 12 and write the initial values to a high-speed memory SRAM in the graphic processor 11 (S10). Moreover, the processor 10 and the graphic processor 11 read out image data transmitted from the sensing apparatus group 30 from the main memory 12 and write the image data to the high-speed memory SRAM (S11). Then, the processor 10 and the graphic processor 11 carry out format conversion of the image data and generate neighborhood matrix image data for arithmetic unit input (arithmetic processing data) (S12), and execute arithmetic processing of convolution layer, pooling layer, fully-connected layer, and softmax layer (output layer) of the DNN (S13). This operation is carried out regarding each of a given number of pieces of image data. As the arithmetic result, the image data is either numeral 0 or 1, for example.

Moreover, the processor 10 and the graphic processor 11 determine whether or not the difference between the arithmetic result and teaching data that is correct answer data of the image data is equal to or smaller than a threshold (S14). If the difference is not equal to or smaller than the threshold (NO of S14), the processor 10 and the graphic processor 11 carry out backward operation of the DNN based on the difference and update the arithmetic parameters (S15). Then, the processor 10 and the graphic processor 11 repeat the above-described steps S11 to S13 with the updated arithmetic parameters. Here, the difference between the arithmetic result and the teaching data is the sum of the difference between each of 1000 arithmetic results obtained by carrying out operations regarding 1000 pieces of image data and a respective one of 1000 pieces of teaching data, or the like, for example.

When the above-described difference has become equal to or smaller than the threshold (YES of S14), the processor 10 and the graphic processor 11 determine that the arithmetic parameters have been set to the optimum values, and end the learning mode. Then, the arithmetic processing in the subsequent determination mode is executed with the optimum values of the arithmetic parameters.

In the determination mode, the processor 10 and the graphic processor 11 read out image data of the determination target from the main memory 12 (S16) and carry out format conversion of the image data and generate neighborhood matrix image data for arithmetic unit input (S17). Then, the processor 10 and the graphic processor 11 execute arithmetic processing of convolution layer, pooling layer, fully-connected layer, and softmax layer of the DNN (S18). The processor 10 and the graphic processor 11 repeat the above-described determination processing until the image data of the determination target ends (S19). The determination result is transmitted to the terminal apparatus 32 and is output.

Figure 3:
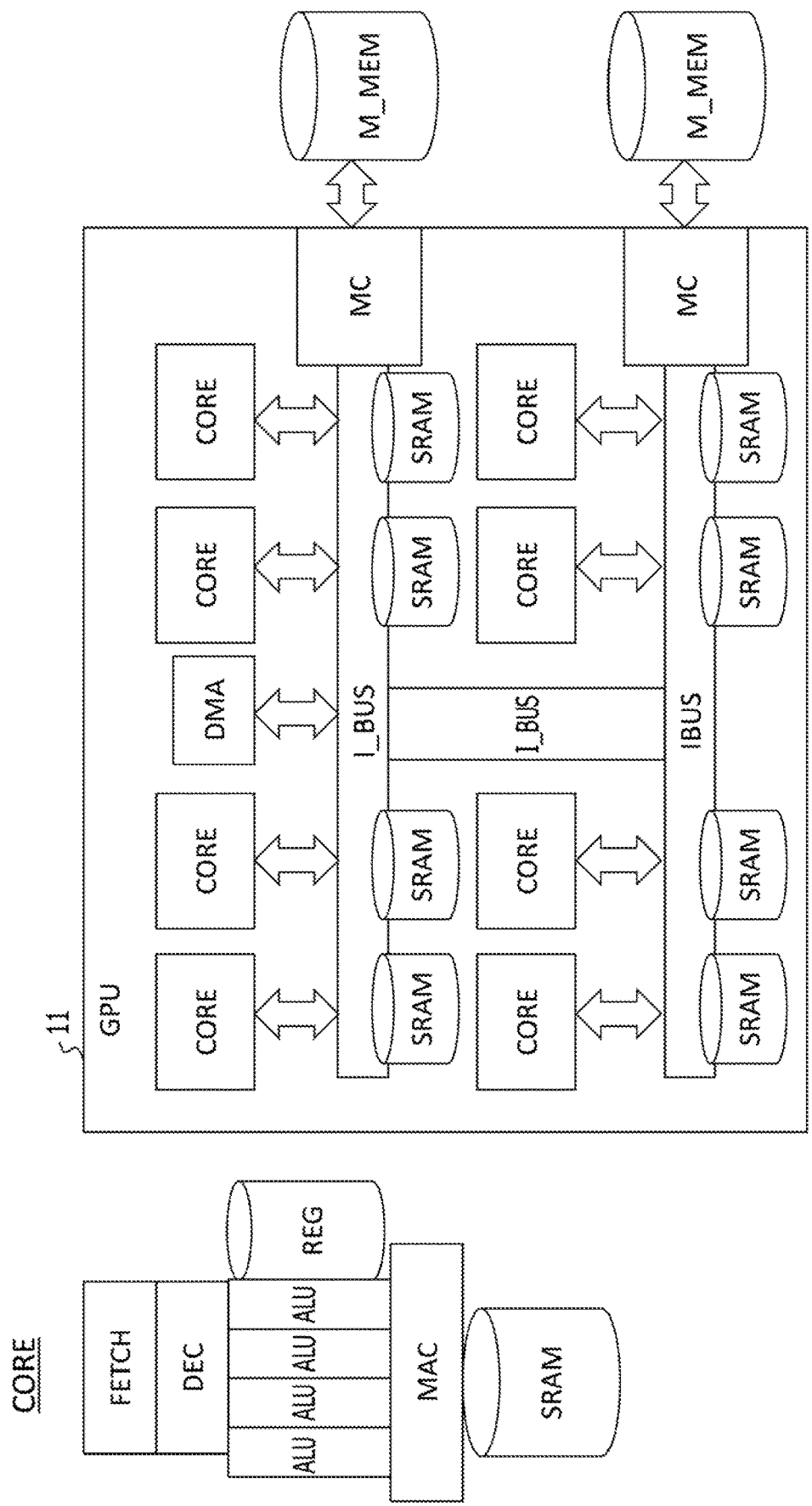
FIG. 3 illustrates a configuration of a graphic processor (GPU) and a configuration of a core CORE in a GPU.

FIG. 3 is a diagram illustrating a configuration of a graphic processor (GPU) and a configuration of a processor core CORE in the GPU. The GPU illustrated by reference to in FIG. 3 may be the GPU 11 illustrated FIG. 1. The GPU 11 may access main memories M_MEM. For example, the GPU 11 includes eight processor cores CORE, plural high-speed memories SRAM disposed corresponding to each processor core CORE, an internal bus I_BUS, and memory controllers MC that carry out access control with the main memory M_MEM. The GPU 11 includes an L1 cache memory in each processor core CORE, an L2 cache memory shared by the eight processor cores CORE, and various peripheral resource circuits, which are not illustrated in FIG. 3. Moreover, the GPU 11 includes a direct memory access control circuit DMA that controls data transfer between internal high-speed memories SRAM, data transfer between the main memory M_MEM and the high-speed memory SRAM, and so forth.

Meanwhile, similarly to a normal processor core, each processor core CORE includes an instruction fetch circuit FETCH that acquires an instruction from a memory, a decoder DEC that decodes the acquired instruction, plural arithmetic units ALU that carry out an arithmetic operation of the instruction based on the decoding result and a register group REG thereof, and a memory access control circuit MAC that accesses the high-speed memory SRAM.

The CPU 11 is implemented by a semiconductor chip, for example, and is a DL apparatus of the present embodiment. The GPU 11 reads out image data from the main memory M_MEM that stores the image data transmitted from the above-described sensing apparatus group 30 and writes the image data to the internal high-speed memory SRAM. Then, the image data written to the high-speed memory SRAM is input to the arithmetic units ALU in each processor core CORE, and the arithmetic units ALU execute arithmetic processing of each layer of the DNN and generate output of the DNN.

Figure 4:
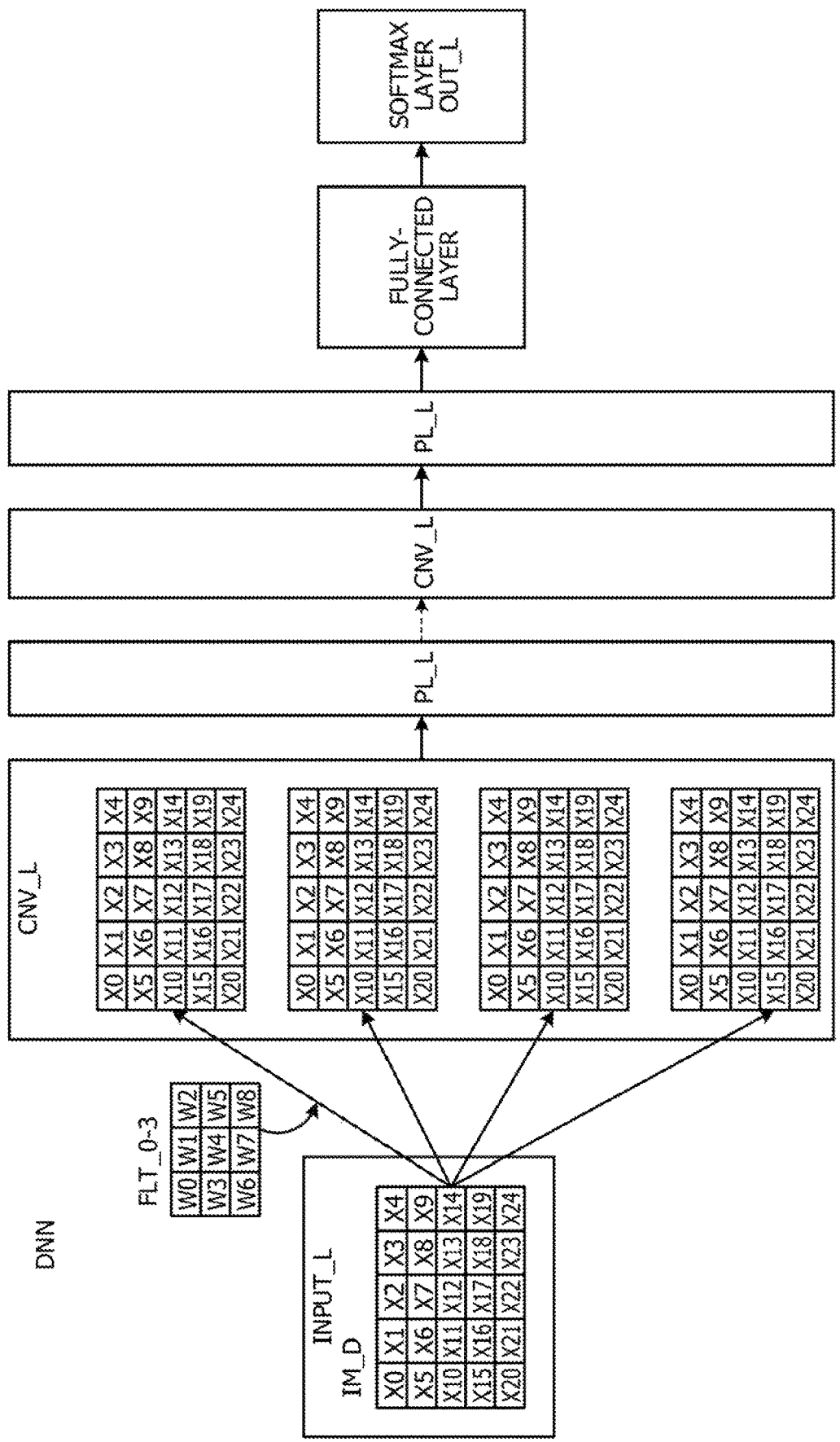
FIG. 4 illustrates one example of a DNN.

For example, in the present embodiment, before the arithmetic units ALU in each processor core CORE execute the arithmetic processing of the DNN, the DMA control circuit carries out format conversion of the image data in the high-speed memory SRAM and generates neighborhood matrix image data for being input to the arithmetic units ALU. In the present embodiment, a circuit of the format conversion of image data is set in the DMA control circuit. However, a format conversion unit that exclusively carries out the format conversion may be set besides the DMA control circuit FIG. 4 is a diagram illustrating one example of a DNN. The DNN to execute determination processing of image data includes an input layer INPUT_L to which image data IM_D that is input data is input, plural sets of convolution layer CNV_L and pooling layer PL_L, a fully-connected layer C_L, and a softmax layer (output layer) OUT_L.

The convolution layer CNV_L generates image data including a certain feature amount through filtering of the image data IM_D by a coefficient filter FLT. The pooling layer PL_L selects a representative value (for example, maximum value) of the values of nodes of the convolution layer CNV_L, for example. Then, to the output layer OUT_L, for example, the determination result of a numeral in the image data (any of 0 to 9) is output as described above.

The convolution layer CNV_L carries out a sum-of-product operation of multiplying each of pieces of pixel data of a neighborhood matrix of 3×3, for example, in the image data IM_D including pixel data of a two-dimensional pixel matrix of M×N and a respective one of pieces of coefficient data of the coefficient filter FLT of the same 3×3 as the neighborhood matrix and adding the multiplication results, and generates pixel data of the attention-paid pixel at the center of the neighborhood matrix. This filtering processing is executed for all pixels of the image data IM_D while the coefficient filter FLT is shifted in the raster-scan direction. This is the convolution operation.

If the pixel data of the neighborhood matrix is Xi and the coefficient data of the coefficient filter FLT is Wi (i=0 to 8), the convolution operation expression of the filtering is as follows.

$$Xi' = \Sigma(Xi * Wi) \quad (1)$$

In this expression, Xi is the pixel data and Wi is the coefficient data and Σ denotes addition for i=0 to 8.

For example, if the attention-paid pixel of the image data IM_D is X6, the pixel data X6' after the filtering based on expression (1) is as follows. For example, the convolution operation is a sum-of-product operation between the pixel data of the neighborhood matrix and the coefficient data of the coefficient filter FLT.

$$X6' = X0*W0 + X1*W1 + X2*W2 + X5*W5 + X6*W6 + X7*W7 + X10*W10 + X11*W11 + X12*W12$$

In the case of carrying out the convolution operation of the above-described expression (1), processing of conversion from the image data to the image data of the neighborhood matrix for being input to the arithmetic unit (neighborhood matrix image data) is desired. This format conversion of the image data will be described below.

FIG. 5 is a diagram illustrating a first example of a sum-of-product operation between image data and a coefficient filter. A sum-of-product operation in which an attention-paid pixel X0 of image data of 5×5 that is input image data IN_DATA is subjected to filtering by the coefficient filter FLT of 3×3 is a sum-of-product operation between nine pieces of pixel data of neighborhood matrix image data of 3×3 centered at the attention-paid pixel X0 and the coefficients W0 to W8 of the coefficient filter FLT. In this case, because the attention-paid pixel X0 is the leftmost, uppermost pixel of the input image data IN_DATA, it is desired to insert five pieces of padding data.

In FIG. 5, a program example of the sum-of-product operation about the attention-paid pixel X0 is represented. According to this program example, regarding each of addresses −1, 0, and +1 of the row "row" and addresses −1, 0, and +1 of the column "col" of the coefficient filter FLT, in the case of row<0 OR col<0, the multiplication value out[0]=0 is obtained because the padding data is "0". In the other case, the multiplication value out[0] is as follows.

$$\text{out}[0] = \text{pixel data} * \text{coefficient data}$$
$$= \text{in}[col + \text{row} * 5] * w[col + 1 + (\text{row} + 1) * 3]$$

In the program, this multiplication value is cumulatively added (+=).

As above, it is desired that the padding data be inserted in the neighborhood matrix image data input for the sum-of-product operation. Therefore, a conditional branch is generated in the loop. Such an operation lowers the efficiency of processing by the arithmetic unit of the graphic processor 11.

[Present Embodiment]

Figure 6:
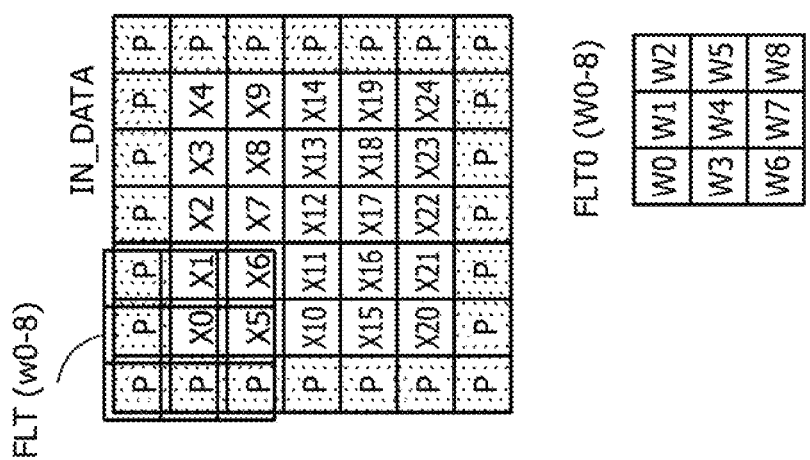
FIG. 6 illustrates a second example of a sum-of-product operation between image data and a coefficient filter.

FIG. 6 is a diagram illustrating a second example of a sum-of-product operation between image data and a coefficient filter. In this example, padding data P has been inserted at the periphery of image data that is the input image data IN_DATA. If the neighborhood matrix image data in which the padding data has been inserted is input to the arithmetic unit as above, processing by the arithmetic unit does not involve a conditional branch as in a program example represented in FIG. 6.

For example, in this program example, the multiplication value out[0] is as follows regarding each of addresses −1, 0, and +1 of the row "row" and addresses −1, 0, and +1 of the column "col" of the coefficient filter FLT.

$$\text{out}[0] = \text{pixel data} * \text{coefficient data}$$
$$= \text{in}[col + (\text{row} + 2) * 5] * w[col + 1 + (\text{row} + 1) * 3]$$

In the program this multiplication value is cumulatively added (+=).

As above, if the padding data has been inserted in the neighborhood matrix image data input to the sum-of-product arithmetic unit, the processing efficiency of the sum-of-product operation by the arithmetic unit may be enhanced.

Figure 7:
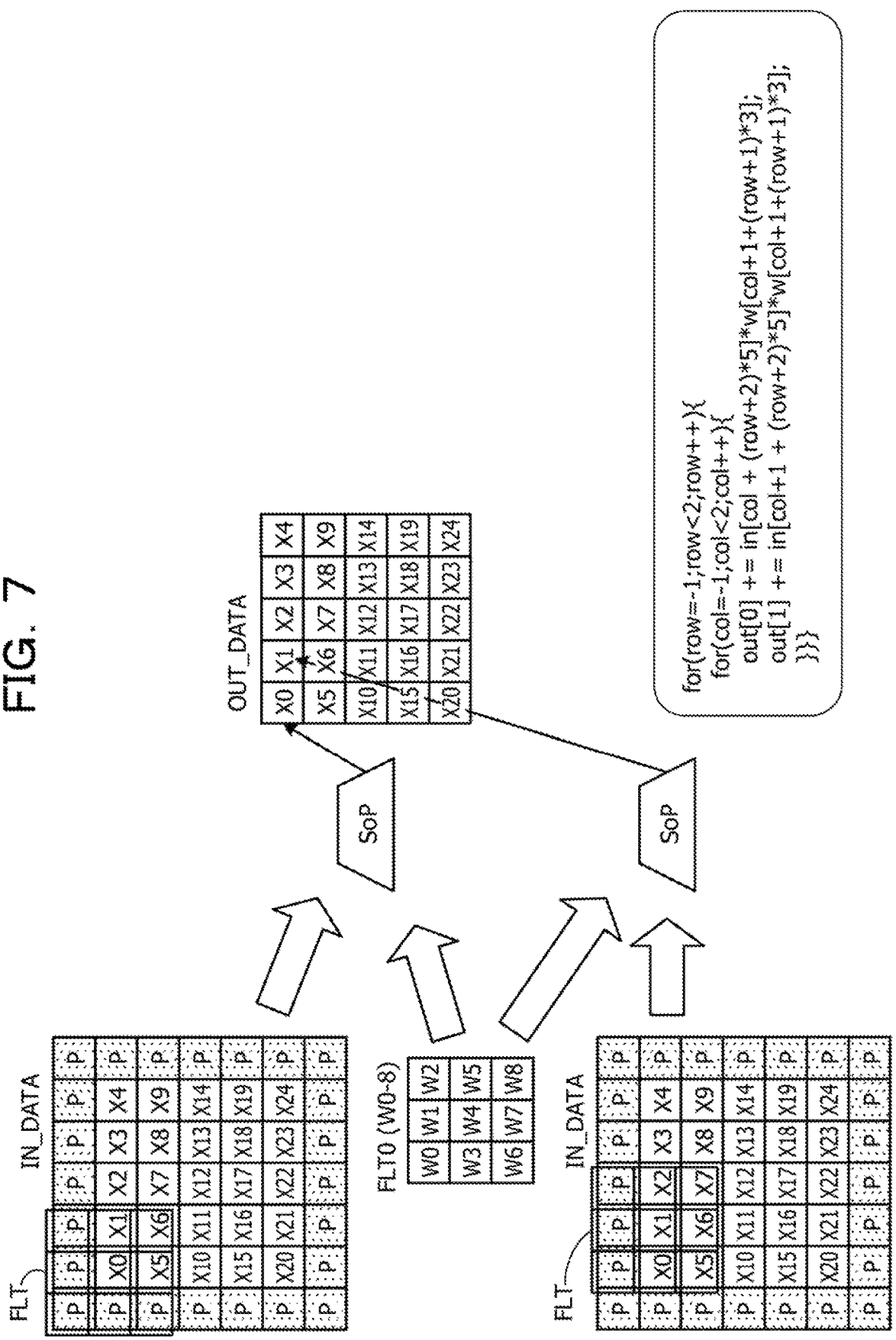
FIG. 7 illustrates an example in which parallel processing is executed by two sum-of-product arithmetic units.

FIG. 7 is a diagram illustrating an example in which parallel processing is executed by two sum-of-product arithmetic units. In this example, image data in which padding data has been inserted is input to the arithmetic unit as the input image data IN_DATA similarly to FIG. 6. Furthermore, two sets of neighborhood matrix image data in which the padding data has been inserted are subjected to a parallel operation by two sum-of-product arithmetic units SoP (Sum of Product). According to a program example in this case, a conditional branch does not exist in the loop and only the following two sum-of-product operation expressions exist.

out[0]=in[col+(row+2)*5]*w[col+1+(row+1)*3]

out[0]=in[col+*l*+(row+2)*5]*w[col+1+(row+1)*3]

Therefore, it is desirable to input the neighborhood matrix image data in which the padding data has been inserted to the multipliers as illustrated in FIG. 7.

Figure 8:
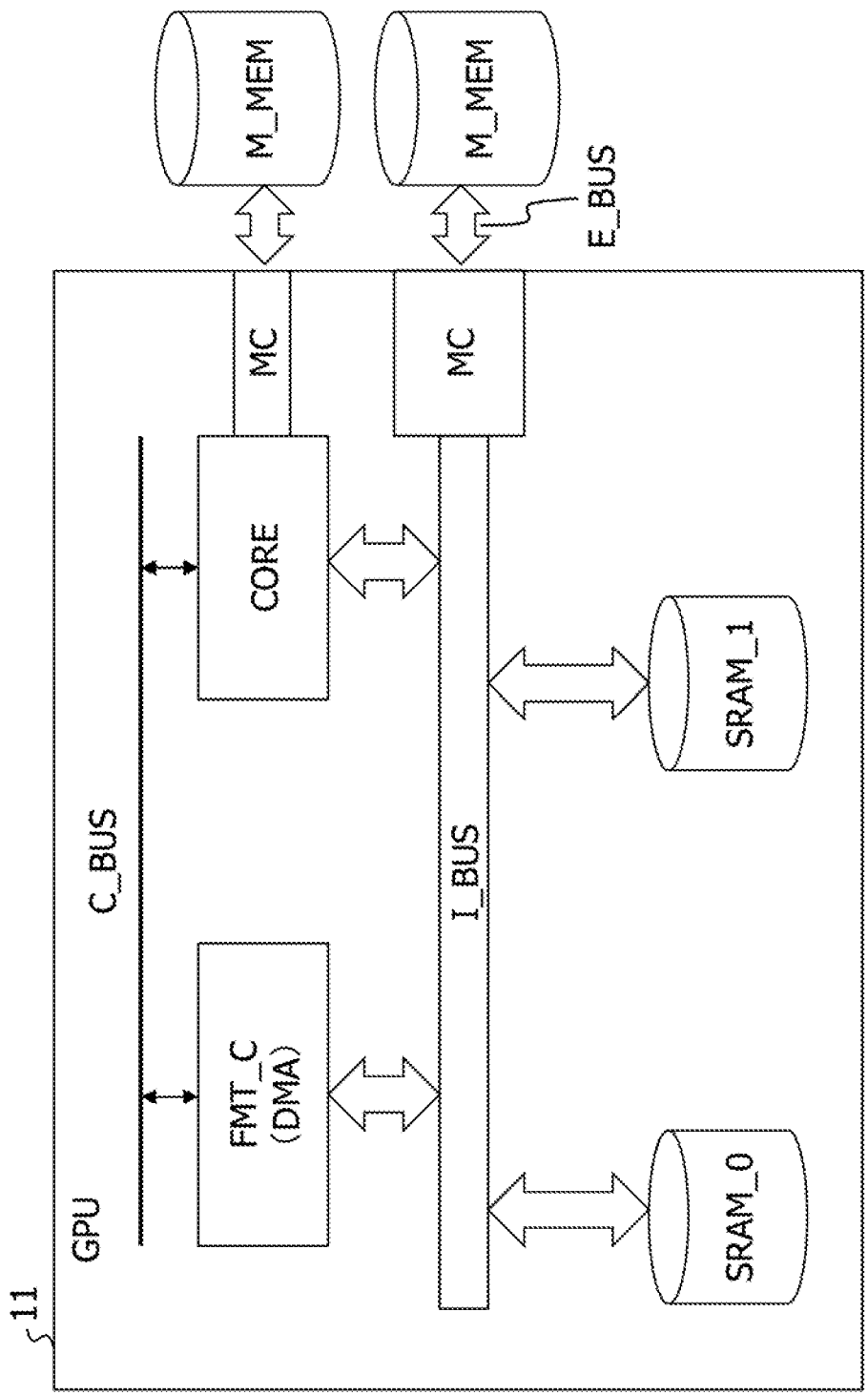
FIG. 8 illustrates a configuration of a graphic processor (DL apparatus) in the present embodiment.

FIG. 8 is a diagram illustrating a configuration of a graphic processor GPU (DL apparatus) in the present embodiment. The GPU 11 in FIG. 8 represents a configuration obtained by simplifying the configuration of FIG. 3. The GPU 11 is a DL chip (DL apparatus) that carries out a DL operation.

The GPU 11 includes the processor core CORE, internal high-speed memories SRAM_0 and SRAM_1, the internal bus I_BUS, and the memory controllers MC. Furthermore, the GPU 11 includes a format converter FMT_C of image data and a control bus C_BUS. The format converter FMT_C carries out format conversion of image data input from the main memory M_MEM to neighborhood matrix image data for being input to the arithmetic unit in the processor core CORE. In the present embodiment, the format converter FMT_C is a DMA that carries out data transfer between the high-speed memories SRAM_0 and SRAM_1. For example, the DMA includes a format converter in addition to the original data transfer circuit. However, the format converter may be configured solely separately from the DMA. Furthermore, image data in the high-speed memory SRAM_0 is input to the DMA, and the DMA writes neighborhood matrix image data generated by format conversion to the different high-speed memory SRAM_1.

The processor core CORE has a built-in sum-of-product arithmetic unit. The sum-of-product arithmetic unit multiplies the neighborhood matrix image data generated by the format converter FMT_C and coefficient data of a coefficient filter and adds the respective multiplication results.

Figure 9:
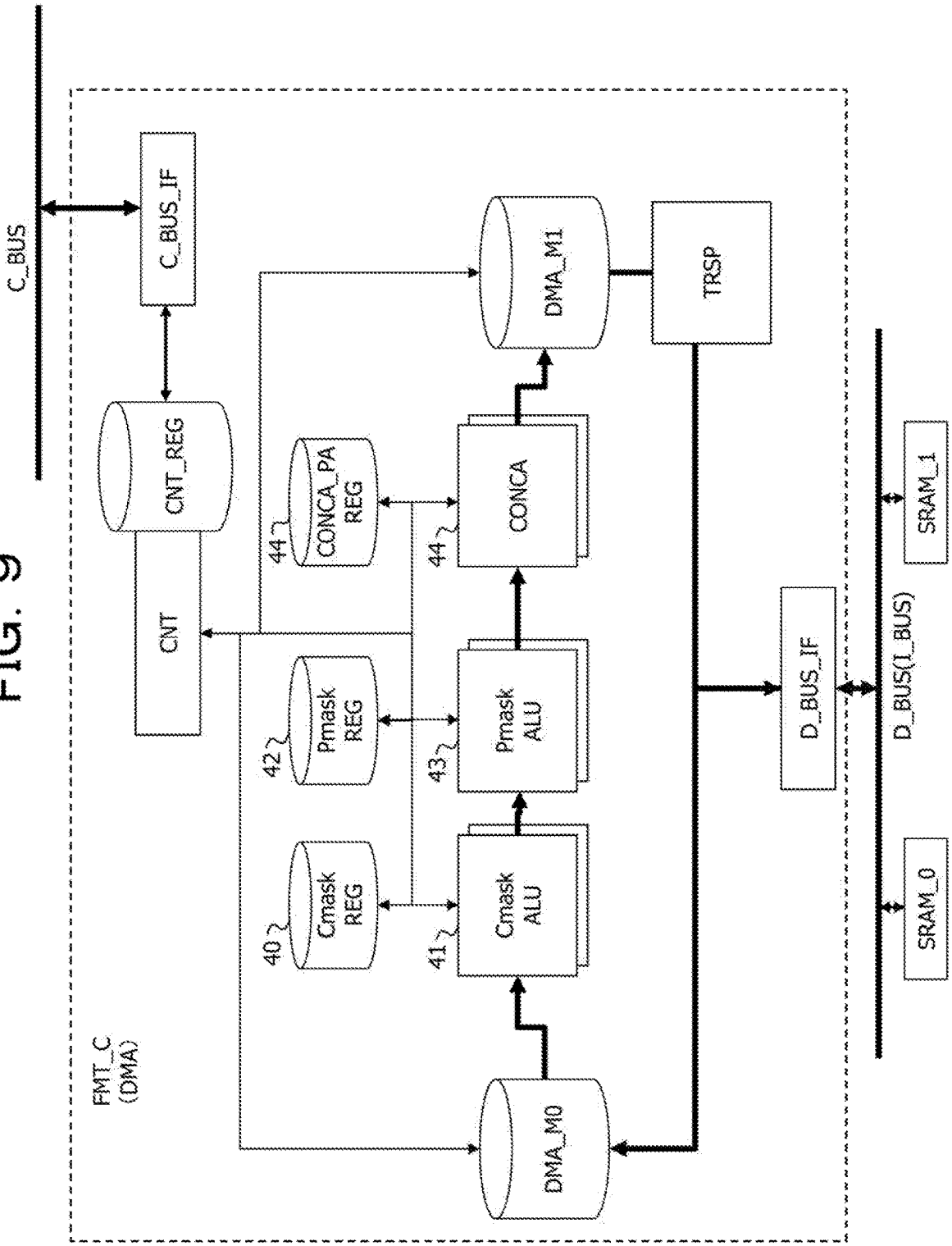
FIG. 9 illustrates a configuration of a format converter.

FIG. 9 is a diagram illustrating a configuration of a format converter FMT_C. The format converter FMT_C includes a control bus interface C_BUS_IF of the control bus C_BUS, a control data register CNT_REG that stores control data, and a control circuit CNT like a state machine. Control data is transferred from a core that is not illustrated to the control bus C_BUS and the control data is stored in the control data register CNT_REG.

The control circuit CNT controls transfer of image data from the first high-speed memory SRAM_0 to the second high-speed memory SRAM_1. Furthermore, in the case of format conversion of image data, the control circuit CNT carries out setting of mask values to the respective mask registers and control of start and end of the format conversion in addition to the above-described transfer control of the image data. For example, the control circuit CNT reads out the image data from the first high-speed memory SRAM_0 and carries out format conversion to write the image data to the second high-speed memory SRAM_1. As above, the control circuit CNT carries out the format conversion in the data transfer of the image data. When carrying out the data transfer, the control circuit CNT specifies the address of the image data and accesses the high-speed memory SRAM. Then, the control circuit CNT sets the mask values of the mask registers for the format conversion corresponding to the address of the image data.

The format converter FMT_C further includes a first DMA memory DMA_M0 and a second DMA memory DMA_M1, and a compression arithmetic unit 41, a padding arithmetic unit 43, and a concatenation (connecting circuit) 45 that are disposed into a pipeline configuration between these memories. Plural sets of these compression arithmetic unit 41, padding arithmetic unit 43, and connecting circuit 45 are disposed and carry out format conversion of plural sets of neighborhood matrix image data in parallel. Furthermore, the format converter FMT_C includes a compression mask register 40 that sets a compression mask Cmask, a padding mask register 42 that sets a padding mask Pmask, and a connecting circuit parameter register 44 that sets parameters of the connecting circuit 45. Moreover, the format converter FMT_C includes a transposition circuit TRSP that carries out transposition of image data and a data bus interface D_BUS_IF coupled to a data bus D_BUS of the internal bus I_BUS.

Figure 10:
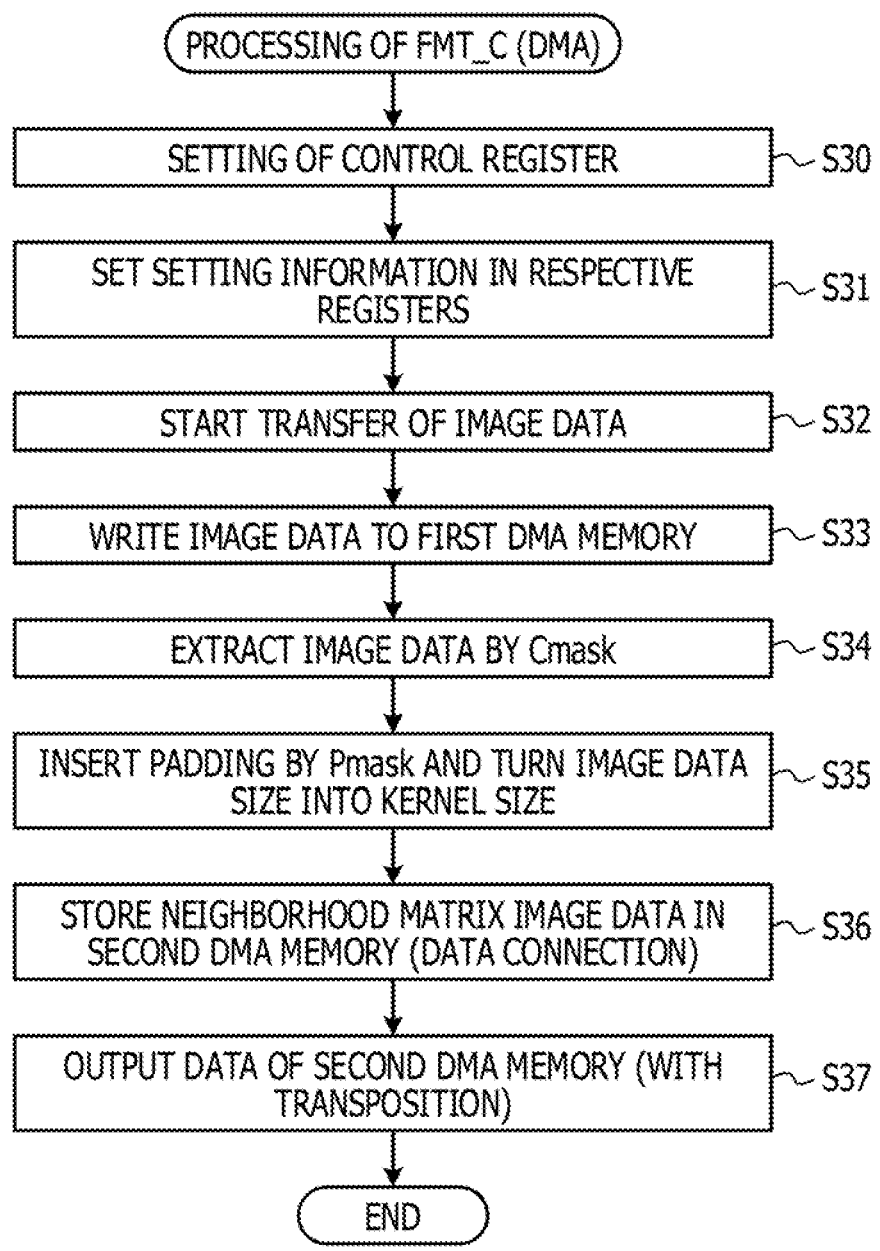
FIG. 10 is a flowchart diagram illustrating operation of a format converter.

FIG. 10 is a flowchart diagram illustrating operation of a format converter. Operation of the format converter will be described based on this flowchart diagram. In addition, concrete examples of the compression mask and the padding mask will be represented and operation of converting image data to neighborhood matrix image data for input will be represented.

First, by the core of the GPU 11, an image data transfer request flag, parameters of data transfer, parameters of format conversion carried out in image data transfer are set in the control data register CNT_REG in the DMA (S30). The parameters of data transfer are the address of the transfer source high-speed memory, the data amount, the address of the transfer destination high-speed memory, and so forth, for example. Furthermore, the parameters of format conversion are identification information of the attention-paid pixel (matrix number of image data or the like), coefficients of the coefficient filter, the number of pieces of padding, padding data, format information of input data of the sum-of-product arithmetic unit, and so forth, for example.

In response to this setting, the control circuit CNT sets the compression mask Cmask, the padding mask Pmask, and the connecting circuit parameters based on the matrix number of the attention-paid pixel in the compression mask register 40, the padding mask register 42, and the connecting circuit parameter register 44 (S31). Then, the control circuit CNT starts transfer of image data from the first high-speed memory SRAM_0 of the transfer source to the second high-speed memory SRAM_1 of the transfer destination (S32).

In the transfer processing of the image data, the control circuit CNT reads out the image data from the first high-speed memory SRAM_0 of the transfer source and writes the image data to the first DMA memory DMA_M0 (S33). The first and second DMA memories DMA_M0 and DMA_M1 are input buffers that temporarily store image data.

Next, the image data in the first DMA memory DMA_M0 is transferred to the compression arithmetic unit 41 and the compression arithmetic unit 41 extracts pixel data of a neighborhood matrix based on the mask values of the compression mask Cmask (S34) and transfers the pixel data to the padding arithmetic unit 43. Then, the padding arithmetic unit 43 inserts padding data into the extracted pixel data based on the mask values of the padding mask Pmask and generates neighborhood matrix image data corresponding to the kernel size (S35).

Figure 11:
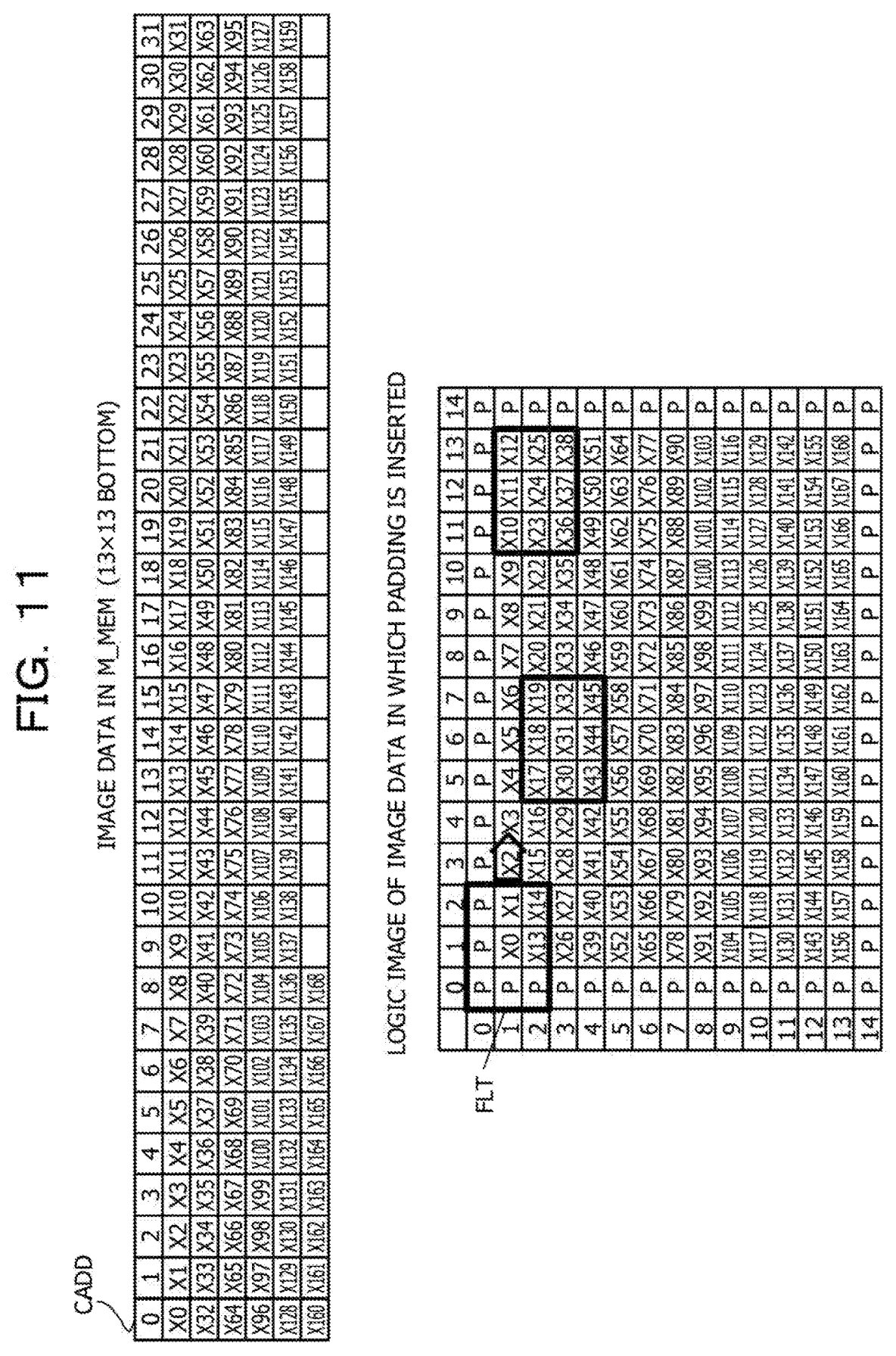

FIG. 11 is a diagram illustrating image data. In the main memory M_MEM, image data of 32 words, for example, is stored on each row of the memory. Furthermore, image data of 13 rows and 13 columns includes 169 pieces of pixel data X0 to X168. As a result, in the main memory M_MEM in FIG. 11, the pieces of pixel data X0 to X31, X32 to X63, X64 to X95, X96 to X127, X128 to X159, and X160 to X168 are stored over six rows. The column address numbers are indicated on the first row of the main memory M_MEM in FIG. 11.

The pixel data of the main memory M_MEM is written to the high-speed memory SRAM_0 of the transfer source through the memory controller MC in advance. The data bus width between the main memory M_MEM and the memory controller MC is 32 words. Thus, the pixel data of 32 words is converted to 16 words as the bus width of the internal bus I_BUS by the memory controller MC and the pixel data is stored in the high-speed memory SRAM_0 of the transfer source.

Meanwhile, image data in which padding is inserted is represented in FIG. 11. The image data includes the pieces of pixel data X0 to X168 of 13 rows and 13 columns. Therefore, when padding data P whose number of pieces of padding is 1 is inserted at the periphery thereof, the image data becomes image data of 15 rows and 15 columns. Furthermore, in the convolution operation, while the coefficient filter FLT of three rows and three columns is moved in the raster-scan direction, a sum-of-product operation between neighborhood matrix image data of three rows and three columns and the coefficients of the coefficient filter FLT is repeated.

Figure 12:
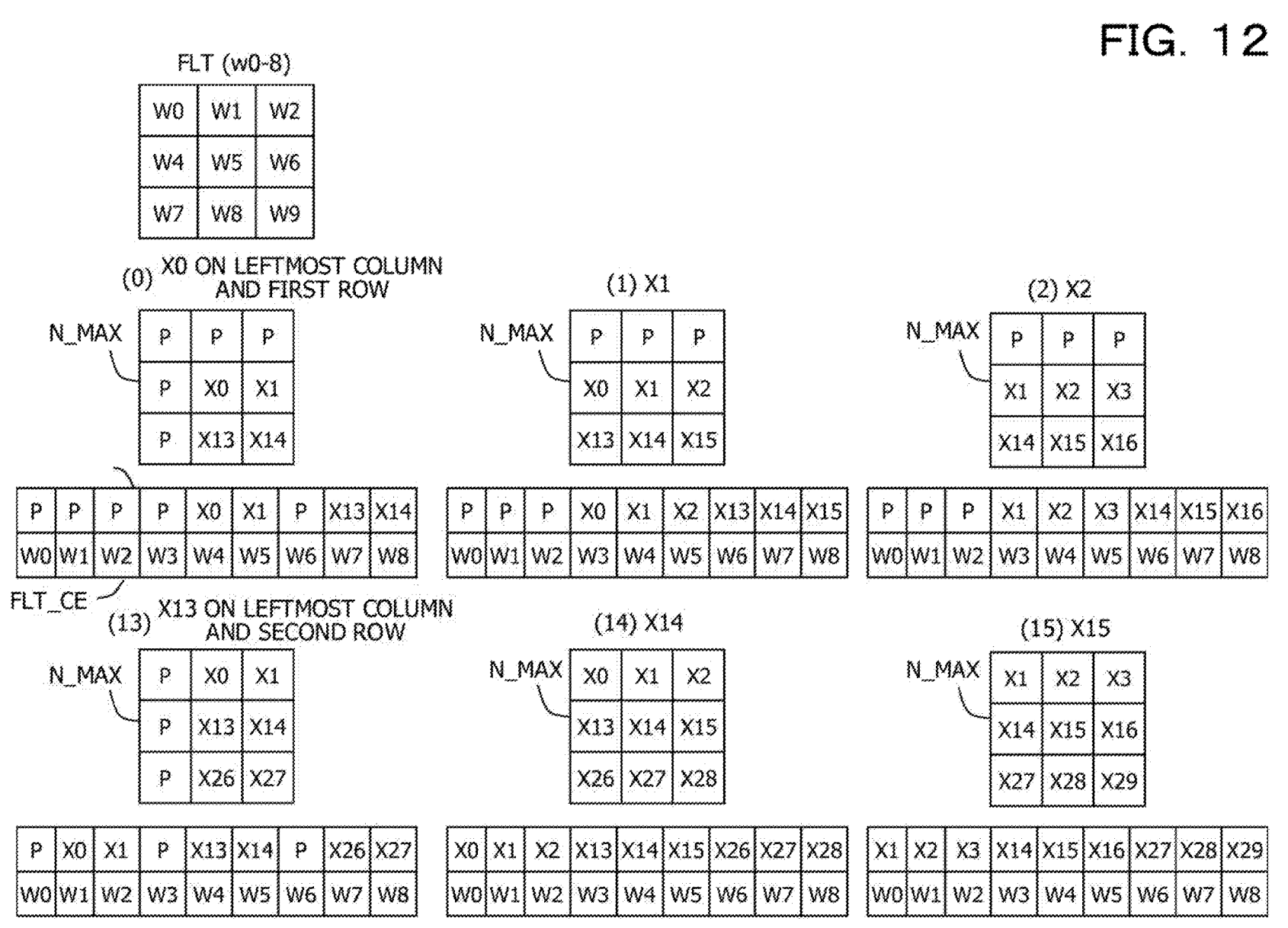

FIG. 12 is a diagram illustrating one example of the neighborhood matrix image data and the coefficients (weights W) of the filter in the case of the image data of 13 rows and 13 columns in FIG. 11. In FIG. 12, the coefficient filter FLT of three rows and three columns and neighborhood matrices N_MX corresponding to attention-paid pixels X0, X1, X2, X13, X14, and X15 are represented. The coefficient filter FLT includes nine coefficients (weights) W0 to W8. Furthermore, the neighborhood matrix N_MX is centered at the attention-paid pixel and includes the same shape and the same number of pieces of pixel data as the coefficient filter FLT.

Meanwhile, the neighborhood matrix N_MX of the attention-paid pixel X0 includes three pieces of the padding data P on the first row, one piece of the padding data P and two pieces of the pixel data X0 and X1 on the second row, and one piece of the padding data P and two pieces of the pixel data X13 and X14 on the third row. Therefore, a data string N_MX_D of the neighborhood matrix N_MX of the attention-paid pixel X0 is [P, P, P, P, X0, X1, P, X13, X14].

Moreover, the neighborhood matrix N_MX of the attention-paid pixel X1 includes three pieces of the padding data P on the first row and includes three pieces of the pixel data X0 to X2 and X13 to X15 on the second row and the third row, respectively. Thus, the data string N_MX_D of the neighborhood matrix N_MX of the attention-paid pixel X1 is [P, P, P, X0, X1, X2, X13, X14, X15]. The attention-paid pixel X2 is also similar to X1.

Next, the neighborhood matrix N_MX of the attention-paid pixel X13 includes one piece of the padding data P and two pieces of the pixel data X0 and X1 on the first row, one piece of the padding data P and two pieces of the pixel data X13 and X14 on the second row, and one piece of the padding data P and two pieces of the pixel data X26 and X27 on the third row. Therefore, the data string N_MX_D of the neighborhood matrix N_MX of the attention-paid pixel X13 is [P, X0, X1 P, X13, X14, P, X26, X27].

Moreover, the neighborhood matrix N_MX of the attention-paid pixel X14 includes three pieces of the pixel data X0 to X2, X13 to X15, and X26 to X28 on the first, second, and third rows, respectively. Thus, the data string N_MX_D of the neighborhood matrix N_MX of the attention-paid pixel X14 is [X0, X1, X2, X13, X14, X15, X26, X27, X28]. The attention-paid pixel X15 is also similar to X14.

The format conversion of the image data is processing of converting the image data of the main memory M_MEM in FIG. 11 to the data string N_MX_D of the nine pieces of pixel data of each neighborhood matrix N_MX represented in FIG. 12. This conversion processing is executed by the compression arithmetic unit 41 and the padding arithmetic unit 43 in the DMA.

Figure 13:
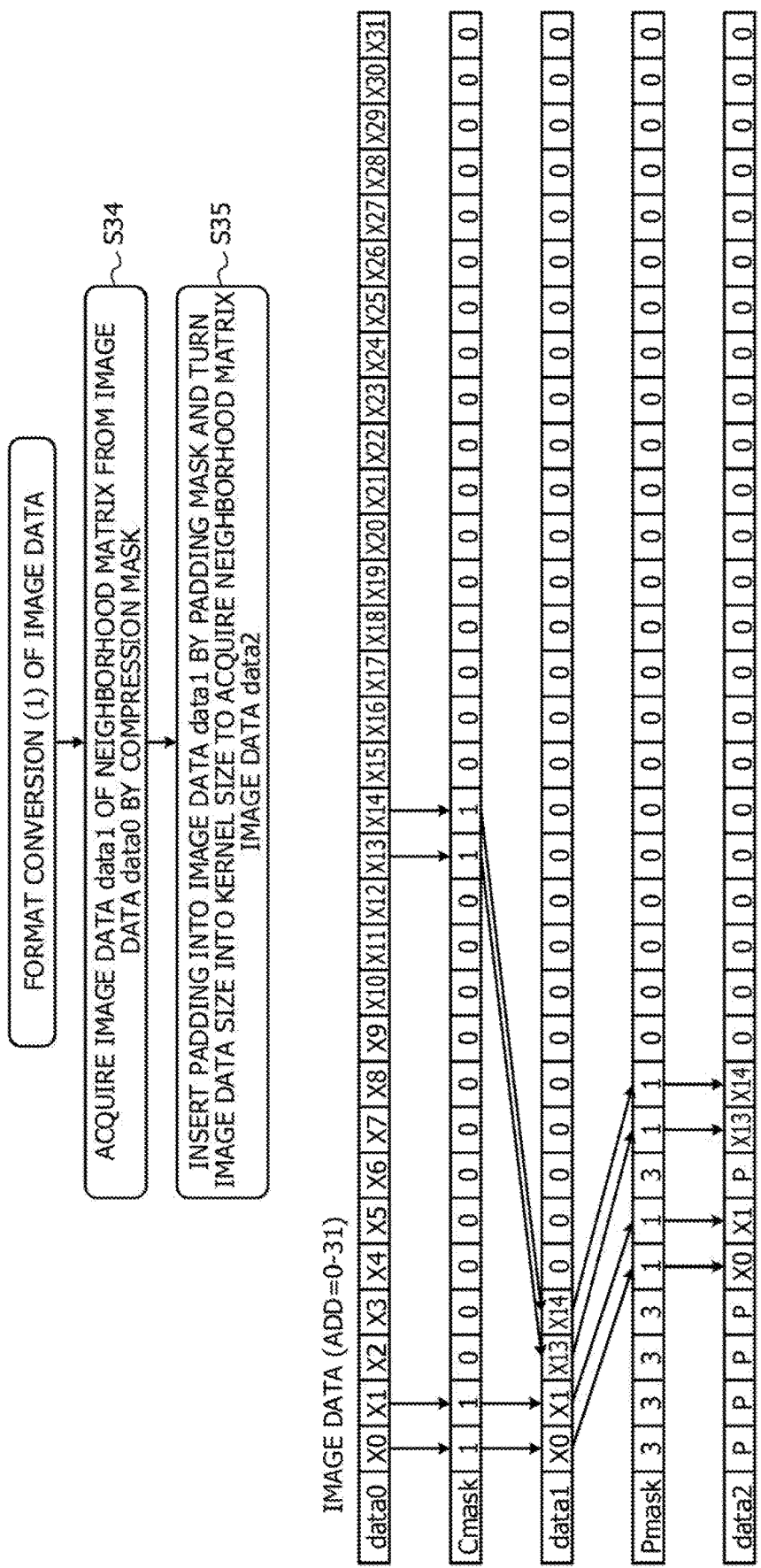
FIG. 13 explains first format conversion.

FIG. 13 is a diagram for explaining first format, conversion. In FIG. 13, the compression arithmetic unit 41 extracts the pixel data to be included in neighborhood matrix image data from image data data0 of 32 words in the first DMA memory DMA_0 by the compression mask Cmask of 32 bits. In the case of image data of 13 rows and 13 columns as in FIG. 11, it is desired to extract the pixel data of the neighborhood matrix from pixel data of up to 36 words. However, in FIG. 13, simplification is made and a description will be made with an example in which pixel data is extracted from pixel data of 32 words. The pixel data of 32 words (each piece of pixel data is grayscale data of 8 bits) is pixel data whose address ADD is 0 to 31.

First, the image data data0 includes pieces of pixel data X0 to X31 and the compression mask Cmask includes 32 mask values. The mask value of the compression mask Cmask is 1 bit, and "0" denotes mask and "1" denotes non-mask. The compression arithmetic unit 41 masks the pixel data of the image data data0 (outputs nothing) if the mask value of the compression mask Cmask is "0," and selects and outputs the pixel data of the image data data0 if the mask value is "1". Then, the compression arithmetic unit 41 disposes the selected pixel data on the lower address side, for example, of image data data1 (may dispose it on the upper address side) without vacancy. In FIG. 13, the pieces of pixel data X0, X1, X13, and X14 are extracted as the image data data1 and the remaining upper address side is all set to "0."

Next, due to the above-described compression arithmetic unit 41, the image data data1 includes the pieces of pixel data X0, X1, X13, and X14 and "0" of 28 words. Furthermore, the mask value of the padding mask Pmask is 2 bits. "0" denotes mask, and "1" denotes non-mask, and "2" denotes reserve, and "3" denotes padding data selection. The padding arithmetic unit 43 masks the pixel data of the image data data1 (outputs nothing) if the mask value of the padding mask Pmask is "0," and selects the pixel data of the image data data1 if the mask value is "1." The padding arithmetic unit 43 inserts the padding data P if the mask value is "3." As a result, image data data2 resulting from the format conversion is [P, P, P, P, X0, X1, P, X13, X14] and [0] of 23 words. This corresponds with the data string N_MX_D of the neighborhood matrix N_MX of the attention-paid pixel X0. The configurations of the compression arithmetic unit 41 and the padding arithmetic unit 43 will be described later.

Figure 14:
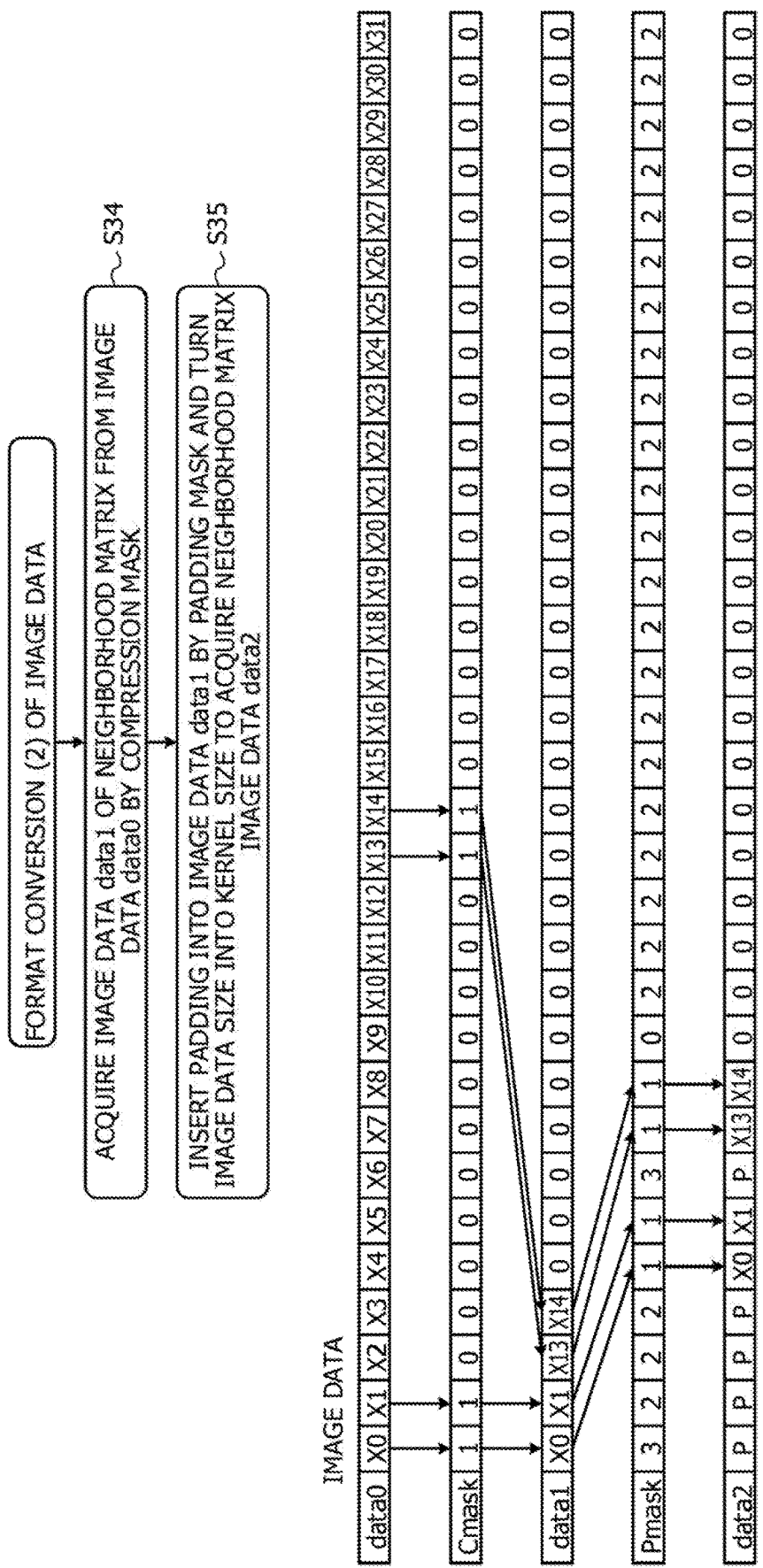
FIG. 14 explains second format conversion.

FIG. 14 is a diagram for explaining second format conversion. In the second format conversion, the compression mask Cmask and the compression arithmetic unit 41 are the same as the first format conversion (FIG. 13). However, the padding mask Pmask and the padding arithmetic unit 43 are different. For example, the padding arithmetic unit 43 copies and outputs the pixel data previous by one clock if the mask value of the padding mask Pmask is "2."

In the second format conversion, the operation of the compression arithmetic unit 41 is the same as the first format conversion. On the other hand, as the operation of the padding arithmetic unit 43, the padding arithmetic unit 43 selects the same pixel data as the output previous by one clock if the mask value of the padding mask Pmask is "2." Furthermore, the neighborhood matrix image data after the conversion is the same as the first data format conversion.

Figure 15:
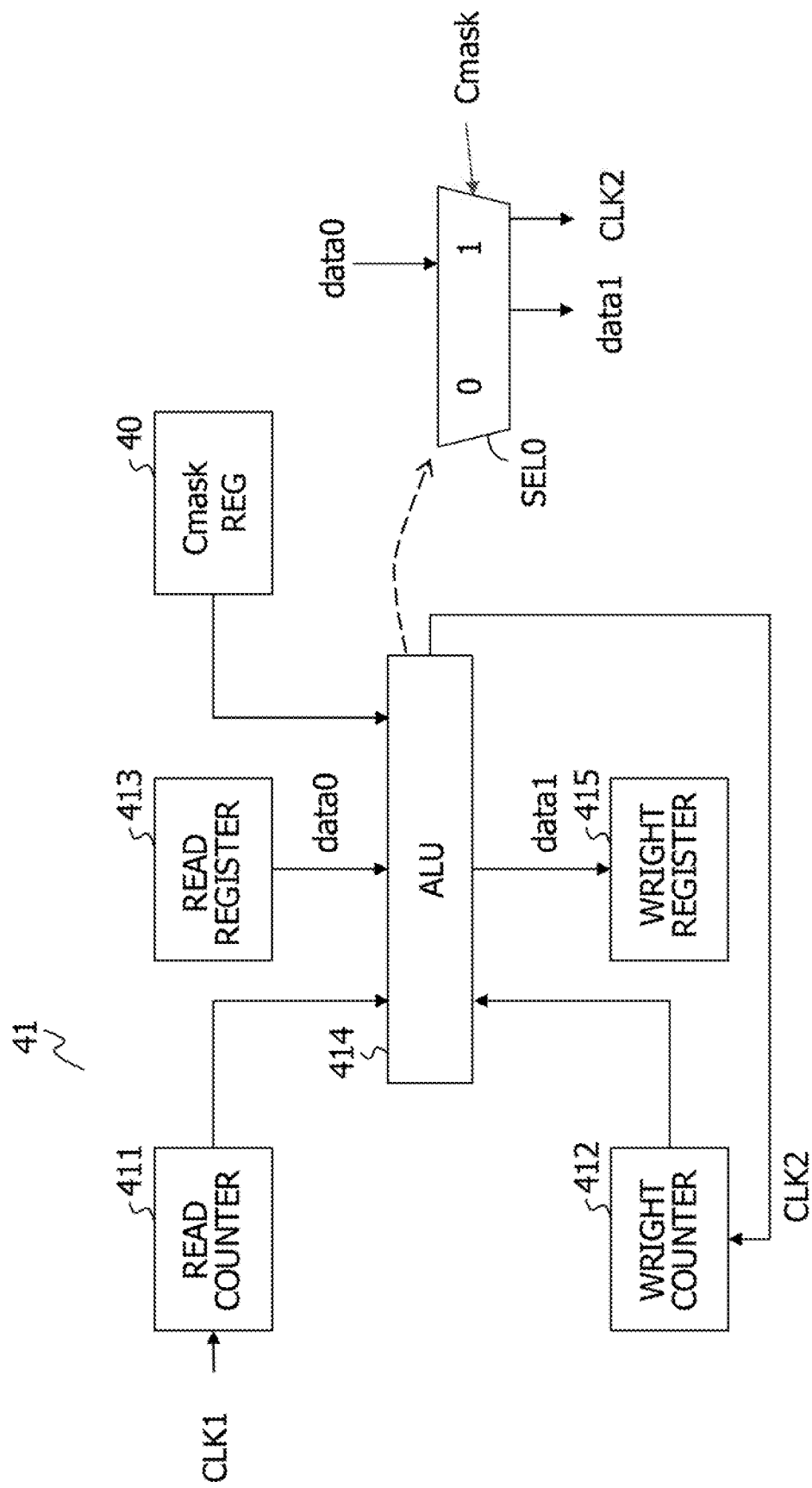
FIG. 15 illustrates a configuration of a compression arithmetic unit.

FIG. 15 is a diagram illustrating a configuration of a compression arithmetic unit. The compression arithmetic unit 41 includes an ALU 414 including a selector SEL0, a read counter 411 that counts up in synchronization with a clock CLK1 of the system, and a write counter 412 that counts up in synchronization with a second clock CLK2 from the ALU 414. The compression arithmetic unit 41 further includes, a read register 413 that stores pixel data of image data input to the ALU 414 and a write register 415 that writes pixel data output by the ALU 414. The read register 413 is an input register in which the image data data0 (see FIG. 13 and FIG. 14) of 32 words in the first DMA memory DM_M0 is stored. Furthermore, the write register 415 is an output register in which the image data data1 is stored.

The selector SEL0 forming the ALU 414 refers to the mask value in the compression mask Cmask corresponding to the count value of the read counter 411. If the mask value is "0," the selector SEL0 masks the image data data0 and does not output it. If the mask value is "1," the selector SEL0 selects and outputs the image data data0 of the count value of the read counter 411 in the read register 413. Meanwhile, if the mask value of the compression mask Cmask is "1," the ALU 414 outputs the second dock CLK2 and causes the write counter 412 to count up. Furthermore, the ALU 414 selects the image data data0 and writes the selected image, data data0 as the image data data1 at the position of the count value of the write counter 412 in the write register 415.

Therefore, the compression arithmetic unit 41 writes the pixel data of the data data0 on the lower address side in the data data1 without vacancy if the mask value is "1" as illustrated in FIG. 13 and FIG. 14.

Figure 16:
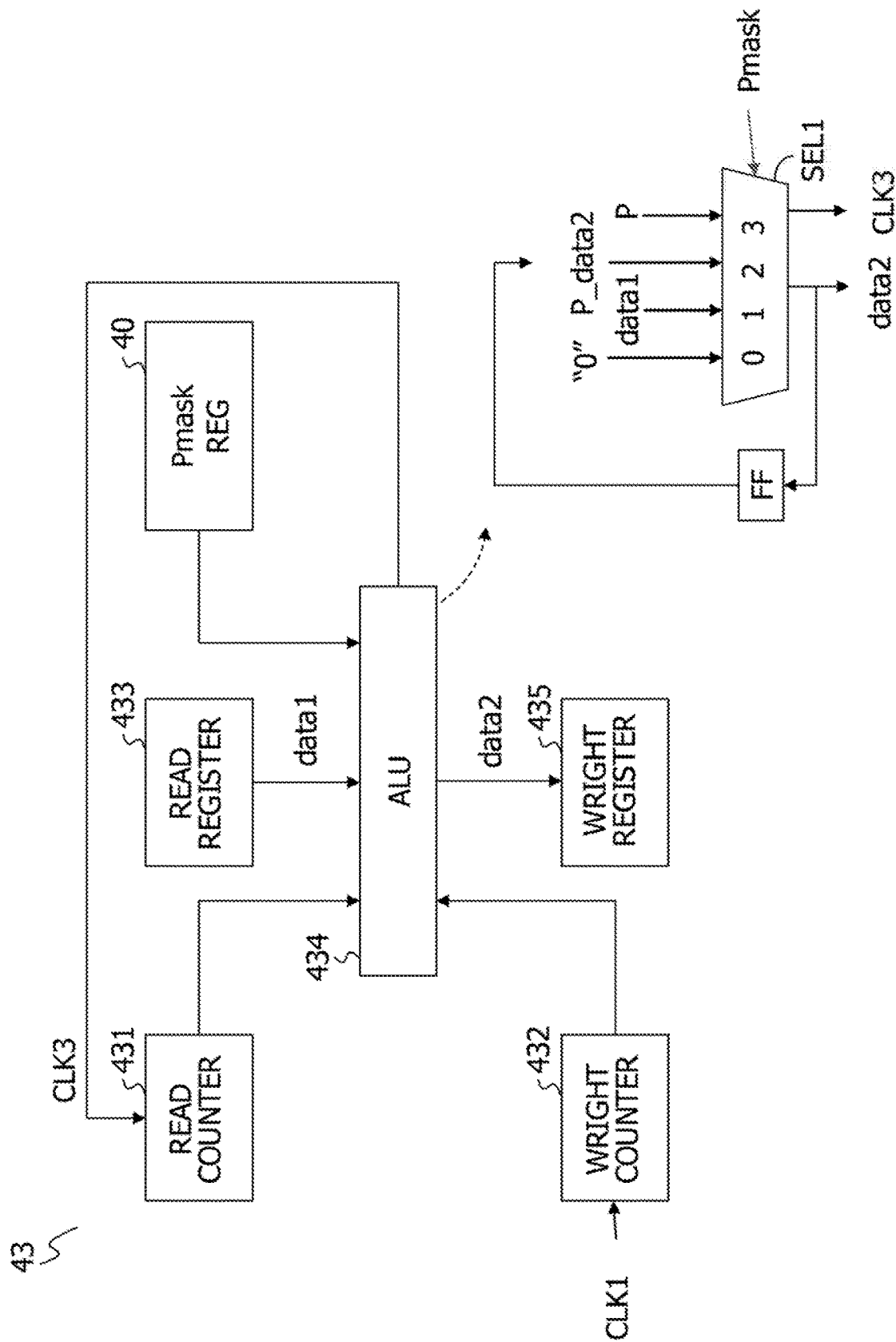
FIG. 16 illustrates a padding arithmetic unit.

FIG. 16 is a diagram illustrating a padding arithmetic unit. The padding arithmetic unit 43 includes an ALU 434 including a selector SEL1, a write counter 432 that counts up in synchronization with the clock CLK1 of the system, and a read counter 431 that counts up in synchronization with a third clock CLK3 from the ALU 434. The padding arithmetic unit 43 further includes a read register 433 that stores pixel data of image data read out by the ALU 434 and a write register 435 to which pixel data selected by the ALU 434 is written. The read register 433 is an input register in which the image data data1 of 32 words (see FIG. 13 and FIG. 14) is stored. Furthermore, the write register 435 is an output register in which the image data data2 is stored.

The selector SEL1 forming the ALU 434 refers to the mask value corresponding to the count value of the write counter 432 in the padding mask Pmask. If the mask value is "0," the selector SEL1 outputs pixel data "0." If the mask value is "1," the selector SEL1 outputs the pixel data of the count value of the read counter 431 in the read register 433. Furthermore, the selector SL1, outputs the padding data P if the mask value is "3." Moreover, if the mask value is "2," the selector SL1 outputs nothing in the example of FIG. 13, and outputs the output data P_data2 previous by one clock stored in an FF in the example of FIG. 14. In addition, if the mask value of the padding mask Pmask is "1," the ALU 434 outputs the third clock CLK3 and causes the read counter 431 to count up.

Therefore, in the example of FIG. 13, the padding arithmetic unit 43 writes pixel data "0" if the mask value is "0" and writes the pixel data of the data data1 if the mask value is "1," and writes the padding data if the mask value is "3," in the image data data2 from the lower address sequentially,.

In the example of FIG. 14, furthermore, the output data P_DATA2 previous by one clock is output and is written to the image data data2 if the mask value is "2." Due to the use of the mask value "2" (copy) for the padding mask Pmask, the selector SEL1 may omit operation of acquiring the pixel data "0,""P," or the like from the register when the mask value is "2."

Figure 17:
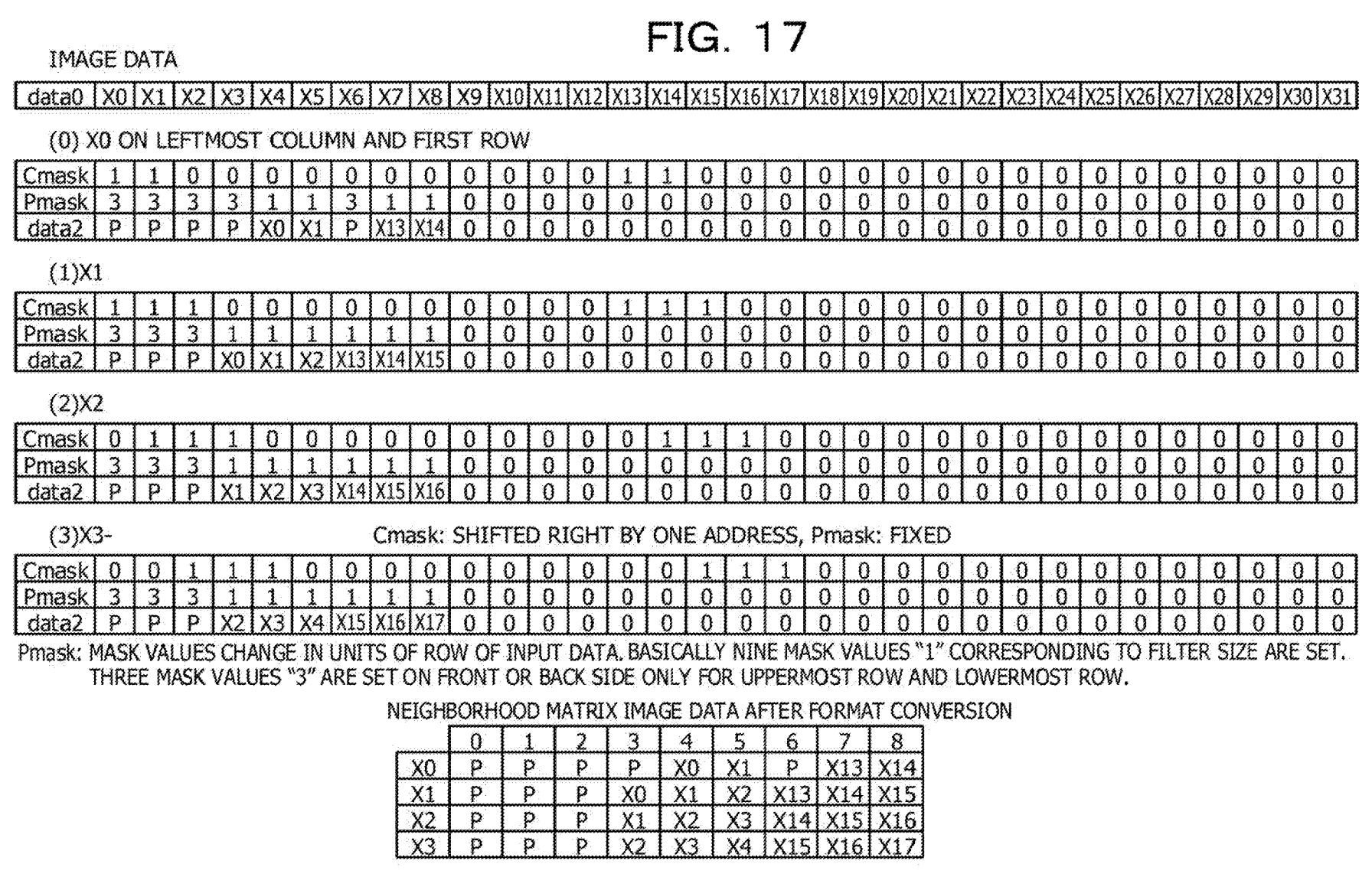

FIG. 17 and FIG. 18 are diagrams illustrating a compression mask and a padding mask corresponding to an attention-paid pixel. As explained with FIG. 12, the padding data is inserted in the neighborhood matrix if the attention-paid pixel exists on the uppermost row, the lowermost row, the leftmost column, or the rightmost column of the two-dimensional image data illustrated in FIG. 11. Therefore, in this case, it is desired that the compression mask Cmask and the padding mask Pmask be special masks. In the example of FIG. 11, the number of pieces of padding inserted at the periphery is 1. If the number of pieces of padding is 2, the padding mask becomes a special mask on the first and second rows from the uppermost row, the first and second columns from the leftmost column, the first and second rows from the lowermost row, and the first and second columns from the rightmost column.

On the other hand, if the attention-paid pixel exists at a position other than the above-described positions in the two-dimensional image data, the padding data is not inserted in the neighborhood matrix. Therefore, three times of mask value "111" in the compression mask Cmask are shifted right every time the attention-paid pixel moves to the right side, and the padding mask Pmask is fixed with nine mask value "1" from the lowest address and mask values "0" of the remaining addresses.

Next, with reference to FIG. 17 and FIG. 18, the compression mask Cmask and the padding mask Pmask when the attention-paid pixel exists on the uppermost row or the leftmost column of the two-dimensional image data will be described. The padding mask Pmask here is the example of FIG. 13 and includes only mask values "0," "1," and "3."

In the case of the attention-paid pixel X0, because the attention-paid pixel X0 exists on the uppermost row and the leftmost column, the compression mask Cmask includes two sets of "11" separated by 11 addresses and the mask values other than them are "0." Furthermore, the padding mask Pmask includes "333," "311," and "311" and the remaining mask values are all "0." Irrespective of the position of the attention-paid pixel, in the padding mask Pmask, nine (nine as the kernel size of the coefficient filter) mask values from the lowest (leftmost) address are "1" or "3" and the remaining mask values are all "0."

In the case of the attention-paid pixel X1, because the attention-paid pixel X1 exists on the uppermost row but does not exist on the leftmost column, the compression mask Cmask includes two sets of "111" separated by 10 addresses through addition of "1" to the right side of two sets of "11" in the case of the attention-paid pixel X0, and the mask values other than them are "0." Furthermore, the padding mask Pmask includes " 333" and "111111" and the remaining mask values are all "0."

In the cases of the attention-paid pixels X2 and X3, because the attention-paid pixels X2 and X3 exist on the uppermost row but exist on a column separate from the leftmost column, the two sets of "111" of the attention-paid pixel X1 are each shifted right by one address in the compression mask Cmask. Furthermore, the padding mask Pmask includes the same "333" and "111111" as the attention-paid pixel X1 and the remaining mask values are all "0."

In the case of the attention-paid pixel X12, because the attention-paid pixel X12 exists on the uppermost row and, the rightmost column, the compression mask Cmask includes two sets of "11" separated by 11 addresses and the mask values other than them are "0." Furthermore, the padding mask Pmask includes "333," "113," and "113" and the remaining mask values are all "0." According to this, the position of the padding column in the neighborhood matrix is opposite to that of the attention-paid pixel X0.

In the case of the attention-paid pixel X13, because the attention-paid pixel X13 does not exist on the uppermost row but exists on the leftmost column, the compression mask Cmask is the same as the attention-paid pixel X0. Furthermore, the padding mask Pmask includes "311," "311," and "311."

In the case of the attention-paid pixel X14, because the attention-paid pixel X14 exists on neither the uppermost row nor the leftmost column, the compression mask Cmask is the same as the attention-paid pixel X1. Furthermore, the padding mask Pmask includes "111," "111," and "111."

In the case of the attention-paid pixel X15, because the attention-paid pixel X15 exists on neither the uppermost row nor the leftmost column, the three sets of "111" of the attention-paid pixel X14 are shifted right in the compression mask Cmask. Furthermore, the padding mask Pmask includes "111," "111," and "111" as with the attention-paid pixel X14.

Although diagrammatic representation is not particularly made, if the attention-paid pixel moves from the uppermost row and the leftmost column to the lowermost row and the rightmost column, difference from the explanation of FIG. 17 and FIG. 18 exists in that the padding row is the third row, but the padding column is the same. Therefore, description is not repeated here.

Figure 19:
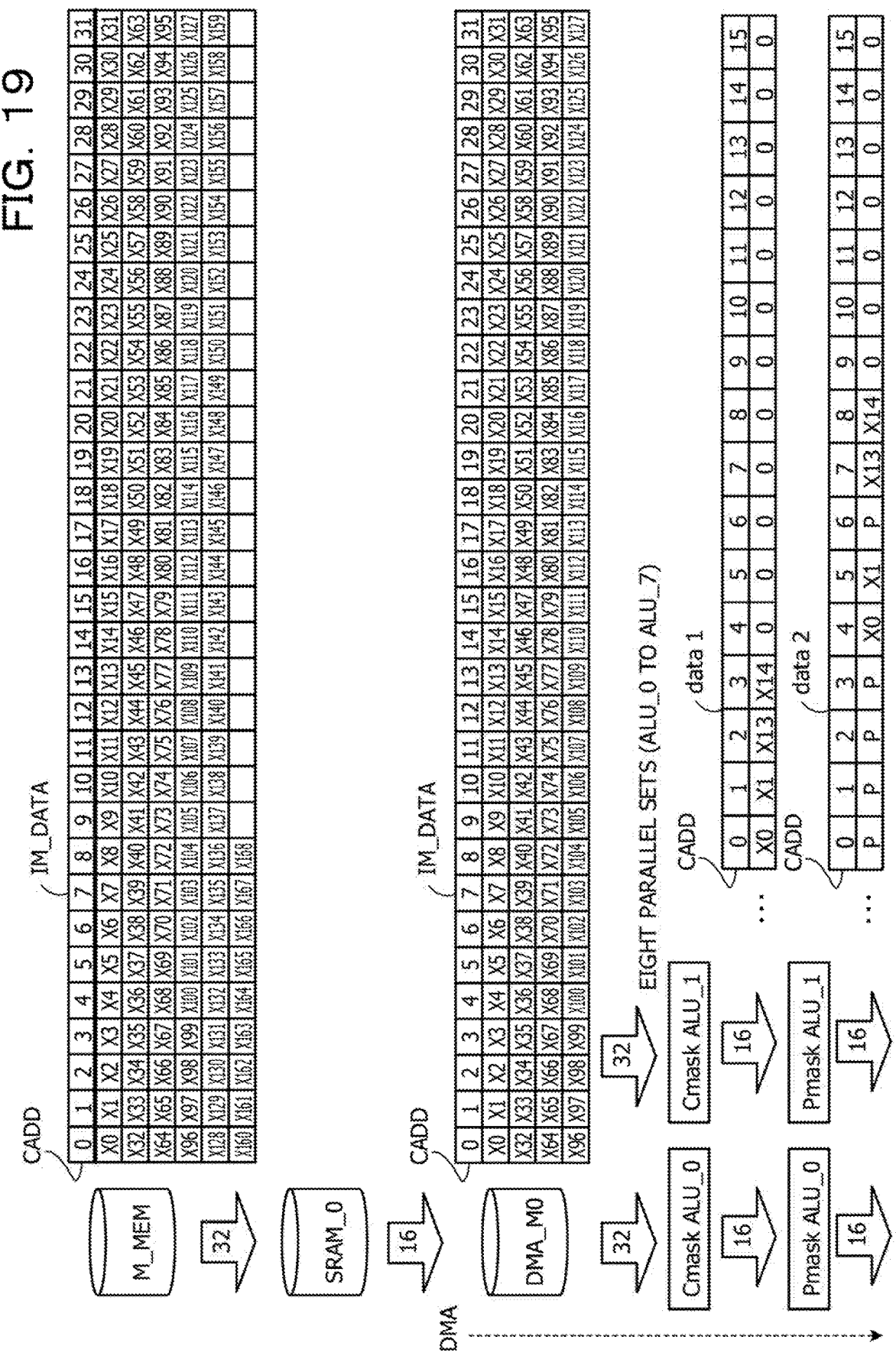
FIG. 19 illustrates a first example of generation procedure of neighborhood matrix data for input to be input to a sum-of-product arithmetic unit.
Figure 20:
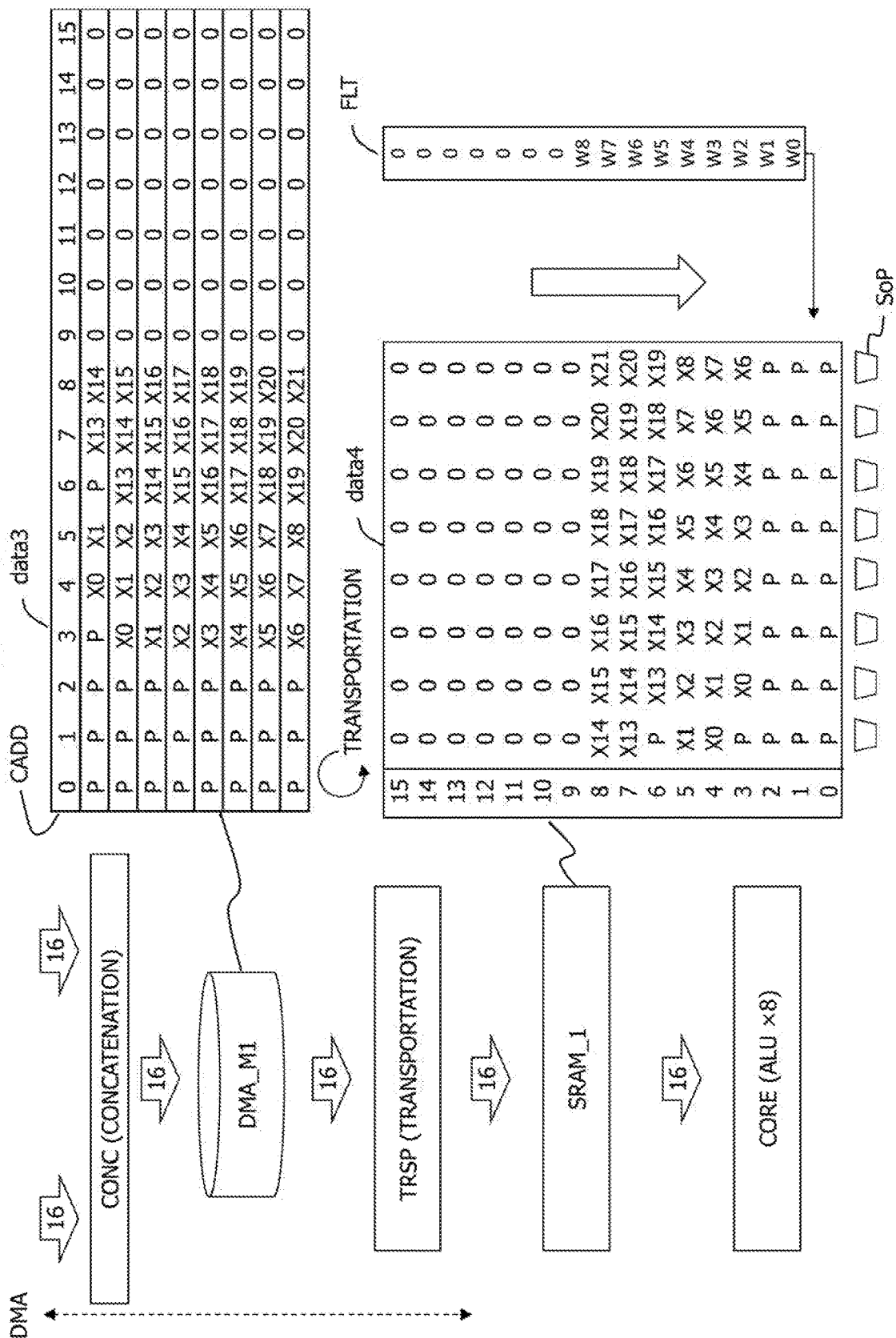
FIG. 20 is another diagram illustrating the first example of the generation procedure of the neighborhood matrix data for input to be input to the sum-of-product arithmetic unit.

FIG. 19 and FIG. 20 are diagrams illustrating a first example of generation procedure of neighborhood matrix data for input to be input to a sum-of-product arithmetic unit. As illustrated in FIG. 19, the main memory M_MEM stores image data IM_DATA of 13 rows and 13 columns in which one row has a 32-word width. Column addresses CADD of 32 columns (=0 to 31) are indicated in the image data IM_DATA. Meanwhile the image data IM_DATA of 13 rows and 13 columns includes pieces of pixel data of 169 words X0 to X168.

First, the memory controller MC in the GPU 11 illustrated in FIG. 8 reads out the image data IM_DATA in the main memory M_MEM through an external bus with a 32-word width and converts the 32-word width to a 16-word width to write the image data IM_DATA to the first high-speed memory SRAM_0 through the internal bus I_BUS with the 16-word width. This data transfer is carried out by a standard data transfer function of the DMA, for example.

Next, the DMA that is a format converter reads out the image data in the first high-speed memory SRAM_0 through the internal bus I_BUS and writes the image data to the first DMA memory DMA_M0. In the case of the image data of 13 rows and 13 columns illustrated in FIG. 11, nine pixels of the neighborhood matrix of three rows and three columns about the attention-paid pixel X14 are extracted from 29 consecutive pixels X0 to X28.

Furthermore, to generate neighborhood matrix image data of eight consecutive attention-paid pixels, it is desired to store pieces of consecutive pixel data of up to 36 words in the first DMA memory DMA_M0. For example, in the case of the attention-paid pixels X24 to X31, it is desired to allow pieces of consecutive pixel data X10 to X45 of 36 words to be input to the compression arithmetic unit. This means that pieces of consecutive pixel data of 64 words are simultaneously stored in the first DMA memory DMA_M0 and pieces of pixel data of eight sets of neighborhood matrices are extracted by a compression mask of a 64-word width. Furthermore, it is desired to interchange two sets of 64-word pixel data in synchronization with the progress of the data format conversion processing.

Therefore, as illustrated in FIG. 19, the first DMA memory DMA_M0 has capacity to store two sets of 64-word pixel data and pieces of pixel data X0 to X63 and X64 to X127 are stored.

Furthermore, eight sets of compression arithmetic units Cmask_ALU_0 to Cmask_ALU_7 and, padding arithmetic units Pmask_ALU_0 to Pmask_ALU_7 extract pixel data of the neighborhood matrix by the respective compression masks to generate the data data1, and insert padding data by padding masks to generate the data data2. The data data2 is image data of each neighborhood matrix and includes 16 pieces of pixel data as the sum of nine pieces of pixel data and seven pieces of pixel data "0."

Referring next to FIG. 20, a connecting circuit CONC sequentially writes image data of the eight sets of neighborhood matrices to the second DMA memory DMA_M1. As a result, image data data3 of the eight sets of neighborhood matrices include eight sets of 16-word data. This processing of the connecting circuit CONC corresponds to a step S36 in FIG. 10.

The control circuit CNT in the format converter executes transposition processing of interchanging the column direction and the row direction by the transposition circuit TRSP for the image data of the eight sets of neighborhood matrices in the second DMA memory DMA_M1 and writes eight sets of neighborhood matrix image data data4 (16 words) resulting from the transposition to the second high-speed memory SRAM_1. This processing of the control circuit CNT corresponds to a step S37 in FIG. 10.

If the compression arithmetic unit ALU and the padding arithmetic unit ALU in the format converter are not disposed as eight parallel units, the format conversion by the compression mask and the padding mask and writing of neighborhood matrix image data into the second DMA memory DMA_M1 by the connecting circuit CONC are repeatedly carried out eight times.

Furthermore, the processor core CORE in the GPU 11 inputs the eight sets of neighborhood matrix image data that have been subjected to the format conversion in the second high-speed memory SRAM_1 to eight sets of sum-of-product arithmetic units SoP in the processor core CORE in parallel one word by one word, in order of row address RADD. Simultaneously, nine coefficients (W0 to W8) of a coefficient filter are also input to each of the eight sets of sum-of-product arithmetic units SoP. Due to this, at a nine-clock cycle, eight sets of sum-of-product operation results (values of the filtering results of the attention-paid pixels) are generate in parallel.

Figure 21:
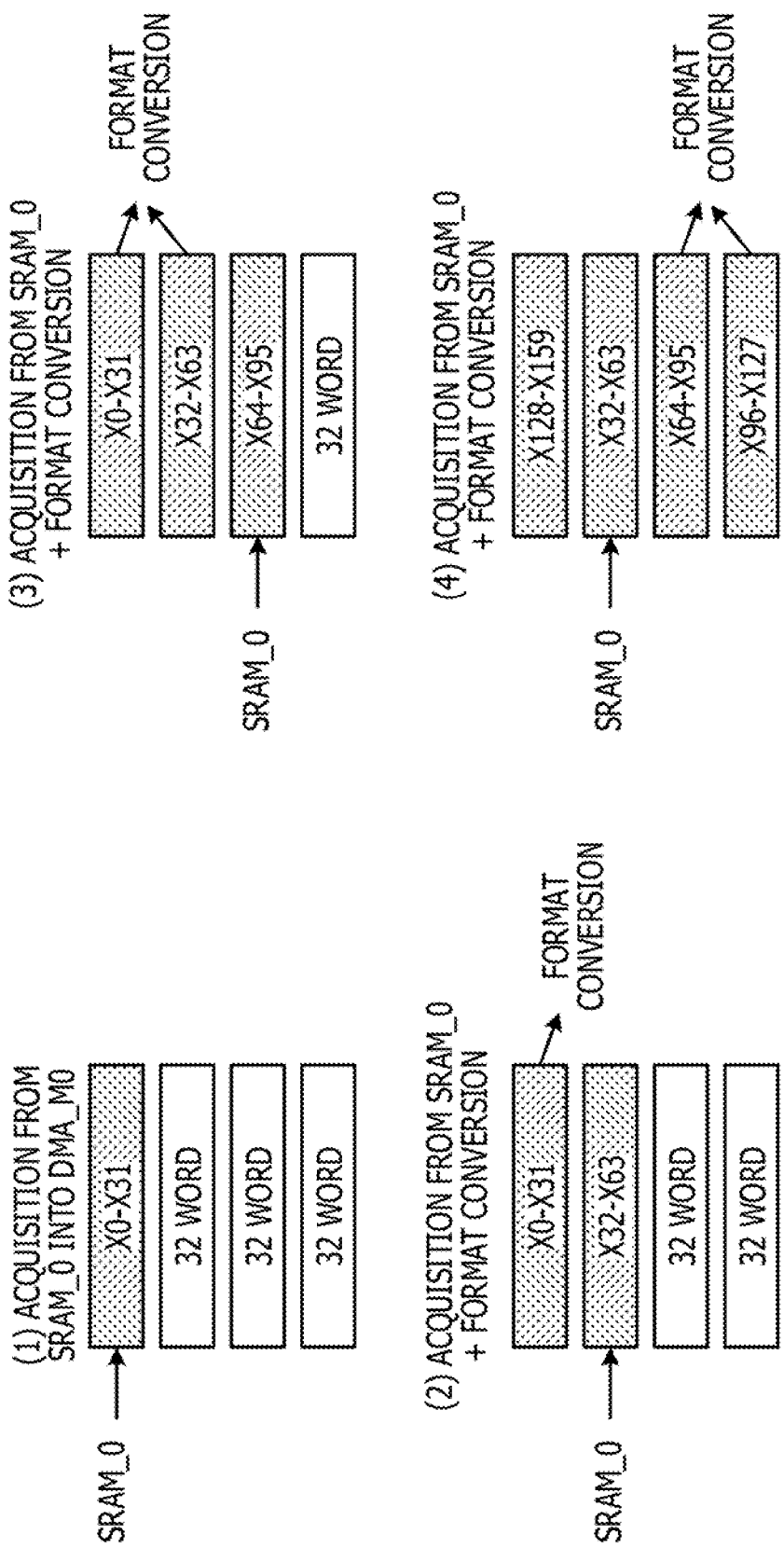
FIG. 21 illustrates relationship between acquisition of pixel data by a first direct memory access (DMA) memory and format conversion processing.

FIG. 21 is a diagram illustrating relationship between acquisition of pixel data by a first DMA memory DMA_M0 and format conversion processing. As described above, to extract eight sets of neighborhood matrix image data in parallel in image data of 13 rows and 13 columns, it is desired to store pieces of consecutive pixel data of up to 64 words in the first DMA memory DMA_M0.

As illustrated in FIG. 21, (1) first, the control circuit CNT of the data format converter acquires pieces of pixel data X0 to X31 of 32 words from the first high-speed memory SRAM_0 and stores them in the first DMA memory DMA_M0 and then carries out data format conversion. (2) Then, according to the progress of the data format conversion, the control circuit CNT acquires the next pieces of pixel data X32 to X63 of 32 words from the first high-speed memory SRAM_0 and stores them in the first DMA memory DMA_M0. (3) Moreover, in the data format conversion for the pieces of pixel data X0 to X63 of 64 words, the control circuit CNT acquires the next pieces of pixel data X64 to X95 of 32 words from the first high-speed memory SRAM_0 and stores them in the first DMA memory DMA_M0. Then, (4) in the data format conversion for the pieces of pixel data X64 to X127 of 64 words, the control circuit CNT acquires the next pieces of pixel data X128 to X159 of 32 words from the first high-speed memory SRAM_0 and stores them in the first DMA memory DMA_M0. Thereafter, the control circuit CNT sequentially acquires and stores piece of pixel data in units of 32 words according to the progress of data format conversion processing similarly.

Figure 22:
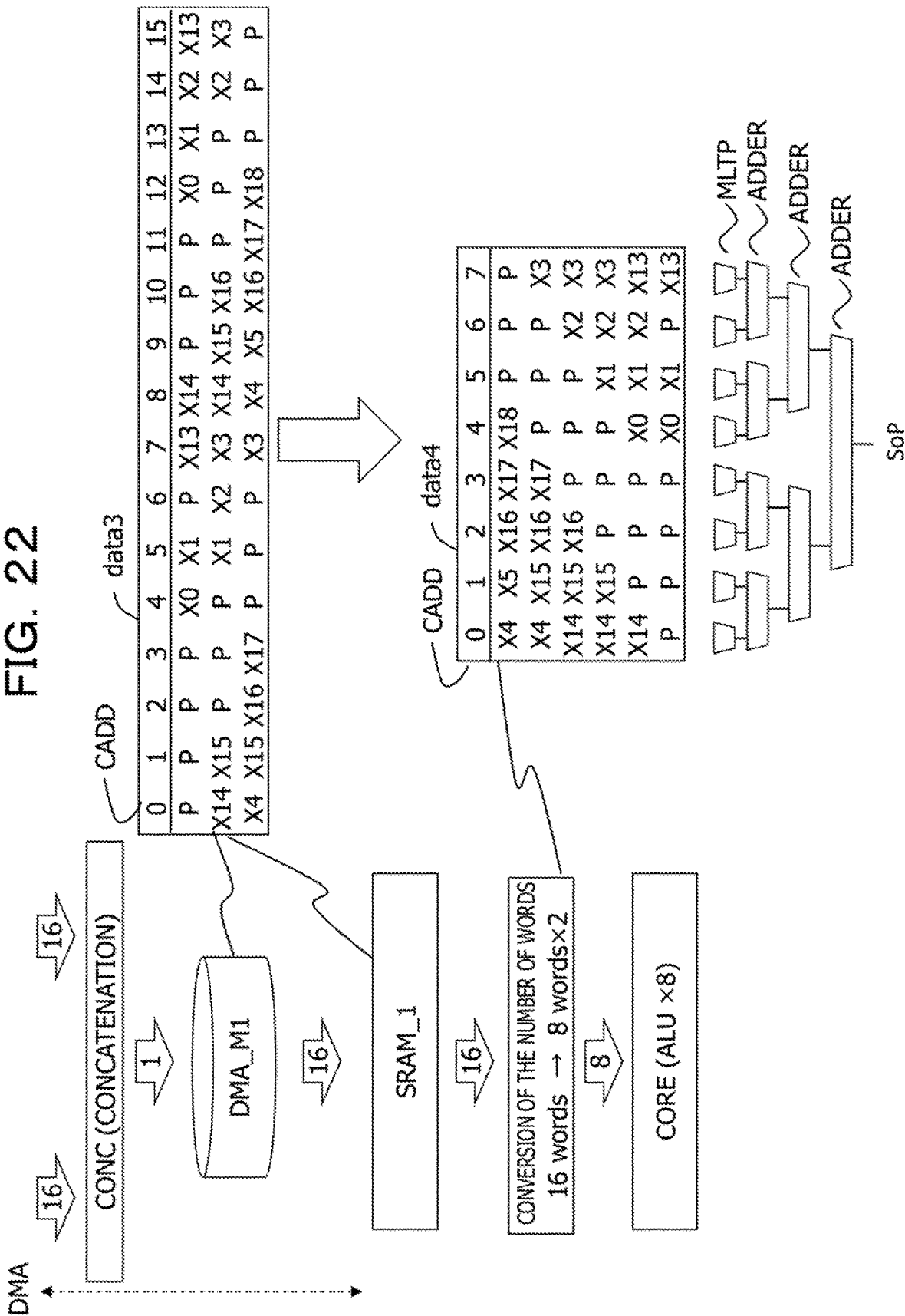
FIG. 22 illustrates a second example of generation procedure of neighborhood matrix data for input to be input to a sum-of-product arithmetic unit.

FIG. 22 is a diagram illustrating a second example of generation procedure of neighborhood matrix data for input to be input to a sum-of-product arithmetic unit. The second example is illustrated in FIG. 19 and FIG. 22. In the second example, as explained with FIG. 19, the memory controller MC transfers the image data IM_DATA in the main memory M_MEM to the first high-speed memory SRAM_0 and the compression arithmetic units ALU and the padding arithmetic units ALU in the DMA that is the data format converter generate the neighborhood matrix image data data2.

Next, as illustrated in FIG. 22, the connecting circuit CONC stores the pieces of pixel data each composed of nine words as the eight sets of neighborhood matrix image data data2 in the second DMA memory DMA_M1 in which one row is composed of 16 words in the raster-scan direction without vacancy. As a result, the first set of neighborhood matrix image data "PPPPX0X1PX13X14" is stored on the first row of the second DMA memory DMA_M1. The second set of neighborhood matrix image data "PPPX0X1X2X13X14X15" is stored across the first row and the second row. The third and subsequent sets of neighborhood matrix image data each composed of nine words are stored on one row or across two rows. This processing corresponds to the step S36 in FIG. 10.

Then, the control circuit CNT transfers image data data3 obtained through packing of the neighborhood matrix image data in the second DMA memory DMA_M1 to the second high-speed memory SRAM_1 without executing the transposition processing. This processing corresponds to the step S37 in FIG. 10.

Next, the processor core CORE in the GPU 11 reads out the neighborhood matrix image data data3 in the second high-speed memory SRAM_1 in units of 16 words and converts 16 words to sets of eight words as in data data4. Then, the processor core CORE inputs the neighborhood matrix image data in units of eight words together with the coefficients (W0 to W8) to eight multipliers MLTP at a first state of a single sum-of-product arithmetic unit SoP disposed in the processor core CORE. As a result, the sum-of-product arithmetic unit SoP multiples every set of eight words in the pieces of pixel data of the neighborhood matrix of nine words with the coefficients and adds the multiplication results to output the sum-of-product operation result.

In the second example, the neighborhood matrix image data data4 for input consistent with the input structure of the special multipliers is generated and thus the arithmetic processing efficiency of the sum-of-product arithmetic unit in the core may be enhanced.

Referring back to FIG. 10, the connecting circuit 45 writes the eight sets of neighborhood matrix image data subjected to the format conversion to the second DMA memory DMA_M1 to connect the eight sets of data. Then, the control circuit CNT writes the eight sets of neighborhood matrix image data in the second DMA memory DMA_M1 to the second high-speed memory SRAM_1 with transposition (or without transposition).

As described above, according to the present embodiment, the format converter in the DMA generates image data of a neighborhood matrix obtained by inserting padding into two-dimensional image data at a high speed. For example, the format converter efficiently executes generation processing of neighborhood matrix image data that is arithmetic data of the convolution operation. As a result, the operation efficiency in the convolution layer in the DNN may be enhanced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
   a first memory configured to store image data including pixel data of a plurality of pixels that are two-dimensionally arranged;
   a second memory configured to store neighborhood matrix image data including pixel data of a neighborhood matrix; and
   a format converter that includes
      a readout circuit configured to read out the image data from the first memory,
      a padding arithmetic unit configured to receive the read-out image data, select pixel data of the received read-out image data and padding data inserted at periphery of the plurality of pixels in accordance with mask values of a padding mask, and generate the neighborhood matrix image data including the pixel data and the padding data, and
      a writing circuit configured to write the neighborhood matrix image data to the second memory.

2. The processor according to claim 1, wherein the format converter further includes a compression arithmetic unit, the compression arithmetic unit being configured to: receive the read-out image data; select pixel data included in the neighborhood matrix image data from a plurality of pieces of pixel data of the received read-out image data to generate compressed image data in accordance with mask values of a compression mask, and the padding arithmetic unit is configured to receive the compressed image data as the read-out image data, and output the neighborhood matrix image data.

3. The processor according to claim 2, wherein
the format converter further includes
a compression mask register configured to store the compression mask,
a padding mask register configured to store the padding mask, and
a controller configured to set the compression mask in the compression mask register and set the padding mask in the padding mask register, and
the controller is further configured to change the mask values of each of the compression mask and the padding mask in accordance with a position of a matrix of the image data of an attention-paid pixel of the neighborhood matrix.

4. The processor according to claim 2, wherein
the format converter includes a plurality of sets, each of the plurality of sets including the compression arithmetic unit and the padding arithmetic unit, the each of the plurality of sets being configured to generate a plurality of sets of neighborhood matrix image data in parallel.

5. The processor according to claim 1, wherein
the format converter further includes
a connecting circuit configured to connect a plurality of sets of neighborhood matrix image data sequentially output by the padding arithmetic unit, and
a transposition circuit configured to transpose the pixel data and the padding data included in each of the connected plurality of sets of neighborhood matrix image data, and generate neighborhood matrix image data for input including a data format corresponding to an input configuration of an arithmetic unit.

6. The processor according to claim 1, wherein
the format converter includes a connecting circuit, the connecting circuit being configured to dispose a plurality of sets of neighborhood matrix image data sequentially output by the padding arithmetic unit into a matrix-manner data format with a smaller number of columns than the number of pixels of the neighborhood matrix in a raster-scan direction without vacancy and generate neighborhood matrix image data for input, and
the writing circuit is configured to write the neighborhood matrix image data for input to the second memory.

7. The processor according to claim 1, wherein
the format converter further includes
a padding mask register configured to store the padding mask, and
a controller configured to set the padding mask in the padding mask register, and
the controller is further configured to change the mask values of the padding mask in accordance with a position of a matrix of the image data of an attention-paid pixel of the neighborhood matrix.

8. The processor according to claim 1, wherein
the format converter includes a plurality of sets of the padding arithmetic units, the plurality of sets of the padding arithmetic units being configured to generate a plurality of sets of neighborhood matrix image data in parallel.

9. The processor according to claim 1, further comprising:
a sum-of-product arithmetic unit configured to receive the neighborhood matrix image data, multiply each pixel of a plurality of pieces of pixel data in the neighborhood matrix image data by a corresponding one of coefficients in a coefficient filter, and add a multiplication result of the each pixel in the neighborhood matrix image data.

10. An information processing apparatus comprising:
a processor; and
a main memory configured to be accessed by the processor, wherein
the processor includes
a first memory configured to store image data including pixel data of a plurality of pixels that are two-dimensionally arranged,
a second memory configured to store neighborhood matrix image data including pixel data of a neighborhood matrix, and
a format converter that includes
a readout circuit configured to read out the image data from the first memory,
a padding arithmetic unit configured to receive the read-out image data, select pixel data of the received read-out image data and padding data inserted at periphery of the plurality of pixels in accordance with mask values of a padding mask, and generate the neighborhood matrix image data including the pixel data and the padding data, and
a writing circuit configured to e the neighborhood matrix image data to the second memory.

11. An operation method performed by a processor including a first memory, a second memory, and a format converter, the first memory being configured to store image data including pixel data of a plurality of pixels that are two-dimensionally arranged, the second memory being configured to store neighborhood matrix image data including pixel data of a neighborhood matrix, the format converter being configured to generate the neighborhood matrix image data, the operation method comprising:
reading out the image data from the first memory,
receiving the read-out image data;
selecting pixel data of the received read-out image data and padding data inserted at periphery of the plurality of pixels in accordance with mask values of a padding mask;
generating the neighborhood matrix image data including the pixel data and the padding data; and
writing the neighborhood matrix image data to the second memory.

* * * * *